(12) United States Patent
Ma et al.

(10) Patent No.: US 11,818,303 B2
(45) Date of Patent: *Nov. 14, 2023

(54) CONTENT-BASED OBJECT DETECTION, 3D RECONSTRUCTION, AND DATA EXTRACTION FROM DIGITAL IMAGES

(71) Applicant: Kofax, Inc., Irvine, CA (US)

(72) Inventors: Jiyong Ma, San Diego, CA (US); Stephen M. Thompson, Oceanside, CA (US); Jan W. Amtrup, Silver Spring, MD (US)

(73) Assignee: KOFAX, INC., Irvine, CA (US)

( * ) Notice: Subject to any disclaimer, the term of this patent is extended or adjusted under 35 U.S.C. 154(b) by 348 days.

This patent is subject to a terminal disclaimer.

(21) Appl. No.: 17/005,171

(22) Filed: Aug. 27, 2020

(65) Prior Publication Data

US 2021/0027431 A1 Jan. 28, 2021

Related U.S. Application Data

(63) Continuation of application No. 16/194,201, filed on Nov. 16, 2018, now Pat. No. 10,783,615, which is a (Continued)

(51) Int. Cl.
*G06K 9/00* (2022.01)
*H04N 1/00* (2006.01)
(Continued)

(52) U.S. Cl.
CPC .............. *H04N 1/00* (2013.01); *G01B 11/14* (2013.01); *G06T 3/00* (2013.01); *G06T 5/002* (2013.01);
(Continued)

(58) Field of Classification Search
CPC .. G06T 5/002; G06T 7/12; G06T 7/50; G06T 2207/30176
See application file for complete search history.

(56) References Cited

U.S. PATENT DOCUMENTS 5,572,654 A 11/1996 Coelho
6,075,905 A 6/2000 Herman et al.
(Continued)

FOREIGN PATENT DOCUMENTS

WO WO-0165486 A1 * 9/2001 ......... G06K 9/00221
WO WO-2011113026 A2 * 9/2011 ........... G06K 9/4671
WO 2017173368 A1 10/2017

OTHER PUBLICATIONS

Why is Real-World Visual Object Recognition Hard, Nicholas Pinto et al., PLoS Computational Biology, Jan. 2008, pp. 0151-0156 (Year: 2008).*

(Continued)

*Primary Examiner* — Jayesh A Patel
(74) *Attorney, Agent, or Firm* — Zilka-Kotab, P.C.

(57) ABSTRACT

A computer-implemented method of detecting an object depicted in a digital image includes: detecting a plurality of identifying features of the object, wherein the plurality of identifying features are located internally with respect to the object; projecting a location of region(s) of interest of the object based on the plurality of identifying features, where each region of interest depicts content; building and/or selecting an extraction model configured to extract the content based at least in part on: the location of the region(s) of interest, the of identifying feature(s), or both; and extracting the some or all of the content from the digital image using the extraction model. Corresponding system and computer program product embodiments are disclosed. The inventive concepts enable reliable extraction of data from digital images where portions of an object are obscured/missing, and/or depicted on a complex background.

20 Claims, 11 Drawing Sheets

Related U.S. Application Data continuation-in-part of application No. 16/151,090, filed on Oct. 3, 2018, now Pat. No. 10,783,613, and a continuation-in-part of application No. 15/396,322, filed on Dec. 30, 2016, now Pat. No. 10,140,511, said application No. 16/151,090 is a continuation of application No. 15/234,993, filed on Aug. 11, 2016, now Pat. No. 10,127,636, said application No. 15/396,322 is a continuation-in-part of application No. 15/157,325, filed on May 17, 2016, now Pat. No. 9,996,741, said application No. 15/234,993 is a continuation-in-part of application No. 14/932,902, filed on Nov. 4, 2015, now Pat. No. 9,946,954, said application No. 15/396,322 is a continuation-in-part of application No. 14/818,196, filed on Aug. 4, 2015, now Pat. No. 9,754,164, said application No. 14/932,902 is a continuation of application No. 14/491,901, filed on Sep. 19, 2014, now Pat. No. 9,208,536, said application No. 14/818,196 is a continuation of application No. 14/209,825, filed on Mar. 13, 2014, now Pat. No. 9,311,531, said application No. 15/157,325 is a continuation of application No. 13/802,226, filed on Mar. 13, 2013, now Pat. No. 9,355,312.

(60) Provisional application No. 62/317,360, filed on Apr. 1, 2016, provisional application No. 61/883,865, filed on Sep. 27, 2013, provisional application No. 61/780,747, filed on Mar. 13, 2013.

(51) Int. Cl.
| | | |
|---|---|---|
| *G06T 7/50* | (2017.01) | |
| *G06T 3/00* | (2006.01) | |
| *G01B 11/14* | (2006.01) | |
| *G06T 5/00* | (2006.01) | |
| *G06T 7/12* | (2017.01) | |
| *G06V 10/20* | (2022.01) | |
| *G06V 30/414* | (2022.01) | |
| *G06V 10/24* | (2022.01) | |
| *G06V 30/418* | (2022.01) | |

(52) U.S. Cl.
CPC ............ *G06T 7/12* (2017.01); *G06T 7/50* (2017.01); *G06V 10/20* (2022.01); *G06V 30/414* (2022.01); *G06T 2207/30176* (2013.01); *G06V 10/247* (2022.01); *G06V 30/418* (2022.01)

(56) References Cited

U.S. PATENT DOCUMENTS

| | | | |
|---|---|---|---|
| 6,246,804 B1 | 6/2001 | Sato et al. | |
| 6,278,798 B1* | 8/2001 | Rao | G06V 10/757 |
| | | | 382/154 |
| 6,281,928 B1* | 8/2001 | Umezaki | G06T 7/11 |
| | | | 348/148 |
| 6,611,613 B1 | 8/2003 | Kang et al. | |
| 6,647,139 B1* | 11/2003 | Kunii | G06F 18/2132 |
| | | | 382/190 |
| 6,778,297 B1 | 8/2004 | Fujiwara | |
| 6,922,485 B2 | 7/2005 | Hirata | |
| 6,930,703 B1 | 8/2005 | Hubel et al. | |
| 6,990,233 B2 | 1/2006 | Park et al. | |
| 7,031,496 B2* | 4/2006 | Shimano | G06F 18/256 |
| | | | 382/104 |
| 7,035,477 B2 | 4/2006 | Cheatle | |
| 7,043,385 B2 | 5/2006 | Stokes | |
| 7,119,924 B2 | 10/2006 | Prabhakar et al. | |
| 7,133,571 B2 | 11/2006 | Cheatle | |
| 7,274,470 B2 | 9/2007 | Lemelin et al. | |
| 7,403,310 B2 | 7/2008 | Miyagi et al. | |
| 7,418,131 B2 | 8/2008 | Wang et al. | |
| 7,502,521 B2 | 3/2009 | Sun et al. | |
| 7,539,344 B2 | 5/2009 | Eguchi et al. | |
| 7,596,265 B2 | 9/2009 | Fan et al. | |
| 7,606,439 B2* | 10/2009 | Lefebure | G06T 3/00 |
| | | | 348/222.1 |
| 7,695,143 B2* | 4/2010 | Kobayashi | H04N 9/3194 |
| | | | 353/121 |
| 7,720,283 B2 | 5/2010 | Sun et al. | |
| 7,945,573 B1 | 5/2011 | Barnes et al. | |
| 8,027,070 B2 | 9/2011 | Dalrymple | |
| 8,068,674 B2* | 11/2011 | Goncalves | G06T 7/001 |
| | | | 382/113 |
| 8,135,261 B1 | 3/2012 | Black | |
| 8,275,190 B2 | 9/2012 | Sakai et al. | |
| 8,285,034 B2 | 10/2012 | Rajaraman et al. | |
| 8,644,600 B2 | 2/2014 | Yang et al. | |
| 8,718,405 B2* | 5/2014 | Fujiki | G06T 17/00 |
| | | | 382/106 |
| 8,872,979 B2 | 10/2014 | Bagga et al. | |
| 8,879,839 B2 | 11/2014 | Ishida et al. | |
| 8,897,565 B1* | 11/2014 | Palm | G06V 30/1475 |
| | | | 382/311 |
| 8,977,075 B2* | 3/2015 | Tytgat | G01B 11/03 |
| | | | 382/294 |
| 9,049,407 B2 | 6/2015 | Finlayson | |
| 9,152,860 B2 | 10/2015 | Cervin et al. | |
| 9,177,225 B1* | 11/2015 | Cordova-Diba | G06T 7/12 |
| 9,224,070 B1* | 12/2015 | Sundareswara | G06V 20/64 |
| 9,355,312 B2* | 5/2016 | Amtrup | G06V 30/142 |
| 9,443,298 B2* | 9/2016 | Ross | G09C 5/00 |
| 9,672,510 B2* | 6/2017 | Roach | G06Q 20/3223 |
| 9,674,505 B2* | 6/2017 | Wu | H04N 23/45 |
| 9,779,296 B1* | 10/2017 | Ma | G06T 7/11 |
| 9,979,296 B2* | 5/2018 | Djenguerian | H02M 3/24 |
| 10,331,966 B1* | 6/2019 | Pribble | G06V 10/25 |
| 10,783,615 B2* | 9/2020 | Ma | G06T 5/002 |
| 10,803,350 B2 | 10/2020 | Ma et al. | |
| 11,062,163 B2 | 7/2021 | Thrasher et al. | |
| 11,062,176 B2 | 7/2021 | Ma et al. | |
| 11,087,407 B2 | 8/2021 | Macciola et al. | |
| 11,302,109 B2 | 4/2022 | Shustorovich et al. | |
| 11,321,772 B2 | 5/2022 | Amtrup et al. | |
| 11,481,878 B2 | 10/2022 | Ma et al. | |
| 11,593,585 B2 | 2/2023 | Ma et al. | |
| 11,620,733 B2 | 4/2023 | Ma et al. | |
| 11,640,721 B2 | 5/2023 | Ma et al. | |
| 11,694,456 B2 | 7/2023 | Ma et al. | |
| 2002/0057838 A1* | 5/2002 | Steger | G06V 10/7515 |
| | | | 382/197 |
| 2003/0031461 A1 | 2/2003 | Takayama | |
| 2003/0220875 A1 | 11/2003 | Lam et al. | |
| 2004/0202349 A1 | 10/2004 | Erol et al. | |
| 2005/0175243 A1 | 8/2005 | Luo et al. | |
| 2005/0207622 A1 | 9/2005 | Haupt et al. | |
| 2006/0017959 A1 | 1/2006 | Downer et al. | |
| 2006/0029276 A1 | 2/2006 | Nagahashi et al. | |
| 2006/0043264 A1* | 3/2006 | Sakurai | H04N 1/387 |
| | | | 250/208.1 |
| 2007/0058856 A1 | 3/2007 | Boregowda et al. | |
| 2007/0204001 A1 | 8/2007 | Hoopes et al. | |
| 2007/0237425 A1* | 10/2007 | Taguchi | G06T 3/4084 |
| | | | 382/299 |
| 2008/0013836 A1* | 1/2008 | Nakamura | G06V 10/50 |
| | | | 382/209 |
| 2008/0031514 A1* | 2/2008 | Kakinami | G06T 7/80 |
| | | | 382/154 |
| 2008/0163103 A1* | 7/2008 | Reponen | G06F 3/0485 |
| | | | 715/788 |
| 2008/0177764 A1* | 7/2008 | Kise | G06V 30/40 |
| 2008/0192991 A1* | 8/2008 | Gremse | G06V 40/172 |
| | | | 382/118 |
| 2008/0226196 A1* | 9/2008 | Kojima | G06V 10/243 |
| | | | 382/289 |
| 2008/0278599 A1 | 11/2008 | Shiohara | |
| 2009/0141940 A1* | 6/2009 | Zhao | G06T 7/248 |
| | | | 382/103 |

(56) References Cited

U.S. PATENT DOCUMENTS

| | | | |
|---|---|---|---|
| 2009/0262200 A1* | 10/2009 | Takabatake | H04N 7/18 348/207.1 |
| 2010/0119113 A1 | 5/2010 | Kuleschow et al. | |
| 2010/0289797 A1* | 11/2010 | Tateno | G06T 17/00 345/419 |
| 2011/0116684 A1* | 5/2011 | Coffman | G06T 7/277 382/103 |
| 2011/0123120 A1* | 5/2011 | Quack | G06V 10/24 382/197 |
| 2011/0175984 A1 | 7/2011 | Tolstaya et al. | |
| 2011/0178708 A1* | 7/2011 | Zhang | G01C 25/005 701/501 |
| 2011/0212717 A1 | 9/2011 | Rhoads et al. | |
| 2011/0240740 A1* | 10/2011 | Li | G06K 7/1447 235/462.08 |
| 2011/0254942 A1* | 10/2011 | Suzuki | A63F 13/213 348/E7.087 |
| 2011/0312374 A1* | 12/2011 | Chen | H04N 1/00244 348/222.1 |
| 2012/0002057 A1* | 1/2012 | Kakinami | G06T 7/85 348/E17.002 |
| 2012/0011142 A1 | 1/2012 | Baheti et al. | |
| 2012/0051628 A1* | 3/2012 | Noguchi | G06V 10/757 382/159 |
| 2012/0087552 A1* | 4/2012 | Lee | G06V 40/171 382/118 |
| 2012/0185530 A1 | 7/2012 | Reza | |
| 2012/0281077 A1 | 11/2012 | Canero Morales et al. | |
| 2013/0004017 A1* | 1/2013 | Medasani | G06V 10/768 382/103 |
| 2013/0044186 A1* | 2/2013 | Jin | G06T 7/174 348/46 |
| 2013/0051671 A1 | 2/2013 | Barton | |
| 2013/0129248 A1 | 5/2013 | Doublet et al. | |
| 2013/0155058 A1* | 6/2013 | Golparvar-Fard | G06Q 10/06311 345/419 |
| 2013/0155474 A1* | 6/2013 | Roach | G06V 10/243 358/473 |
| 2013/0216094 A1 | 8/2013 | DeLean | |
| 2013/0287265 A1* | 10/2013 | Nepomniachtchi | G06Q 20/3276 382/115 |
| 2014/0086488 A1* | 3/2014 | Moteki | G06V 30/418 382/182 |
| 2014/0204204 A1 | 7/2014 | Sumiyoshi et al. | |
| 2014/0270536 A1* | 9/2014 | Amtrup | G06V 30/40 382/195 |
| 2015/0030227 A1 | 1/2015 | Liang et al. | |
| 2015/0146989 A1* | 5/2015 | Shiiyama | G06V 10/462 382/197 |
| 2015/0154742 A1 | 6/2015 | Bocharov et al. | |
| 2015/0371086 A1 | 12/2015 | Wang et al. | |
| 2016/0182805 A1* | 6/2016 | Emmett | G06V 10/17 348/349 |
| 2017/0238011 A1 | 8/2017 | Pettersson et al. | |
| 2017/0372156 A1* | 12/2017 | Kalenkov | G06V 10/44 |
| 2018/0131815 A1 | 5/2018 | Spivakovsky et al. | |
| 2019/0034734 A1 | 1/2019 | Yen et al. | |
| 2019/0130583 A1 | 5/2019 | Chen et al. | |
| 2019/0258895 A1* | 8/2019 | Sacheti | G06V 40/10 |
| 2019/0347485 A1 | 11/2019 | Yang et al. | |
| 2019/0377970 A1 | 12/2019 | Huber, Jr. et al. | |
| 2020/0380643 A1 | 12/2020 | Ma et al. | |
| 2020/0394452 A1 | 12/2020 | Ma et al. | |
| 2020/0394453 A1 | 12/2020 | Ma et al. | |
| 2020/0394763 A1 | 12/2020 | Ma et al. | |
| 2021/0383150 A1 | 12/2021 | Thrasher et al. | |
| 2021/0383163 A1 | 12/2021 | Ma et al. | |

OTHER PUBLICATIONS

Object Recognition from Local Scale-Invariant Features, David G Lowe, Proc. of the International Conference on Computer Vision, Corfu (Sep. 1999), pp. 1-8 (Year: 1999).*

Document capturing method with a camera using Robust Feature Points Detection, Woong Hee Kim et al., IEEE, 2011, pp. 678-682 (Year: 2011).*

Smart ID Reader: Document Recognition in Video Stream, Konstantin Bulatov et al., IEEE, 2017, pp. 39-44 (Year: 2017).*

Notice of Allowance from U.S. Appl. No. 16/997,800, dated Sep. 7, 2022.

Wagner et al., "Pose Tracking from Natural Features on Mobile Phones," IEEE International Symposium on Mixed and Augmented Reality, Sep. 2008, pp. 125-134.

Dubrofsky, E., "Homography Estimation," University of British Columbia, Mar. 2009, 32 pages.

Non-Final Office Action from U.S. Appl. No. 17/348,617, dated Sep. 21, 2022.

Non-Final Office Action from U.S. Appl. No. 17/005,147, dated Sep. 9, 2022.

Non-Final Office Action from U.S. Appl. No. 17/006,650, dated Sep. 7, 2022.

Non-Final Office Action from U.S. Appl. No. 15/396,306, dated Feb. 18, 2022.

Ma et al., U.S. Appl. No. 16/997,800, filed Aug. 19, 2020.

Non-Final Office Action from U.S. Appl. No. 16/206,912, dated Aug. 18, 2020.

Examination Report from European Application No. 14861942.2, dated Jun. 3, 2020.

Non-Final Office Action from U.S. Appl. No. 16/824,518, dated Sep. 3, 2020.

Ma et al., U.S. Appl. No. 17/005,147, filed Aug. 27, 2020.

Notice of Allowance from U.S. Appl. No. 16/206,926, dated Sep. 8, 2020.

Ma et al., U.S. Appl. No. 17/006,636, filed Aug. 28, 2020.

Ma et al., U.S. Appl. No. 17/006,650, filed Aug. 28, 2020.

Notice of Allowance from U.S. Appl. No. 16/569,247, dated Aug. 31, 2021.

Patent Board Decision on Appeal from U.S. Appl. No. 15/396,306, dated Oct. 29, 2021.

Non-Final Office Action from U.S. Appl. No. 16/997,800, filed Nov. 9, 2021.

Kim et al., "Document Capturing Method with a Camera using Robust Feature Points Detection," International Conference on Digital Image Computing: Techniques and Applications, IEEE, 2011, pp. 678-682.

Bulatov et al., "Smart IDReader: Document Recognition in Video Stream," 14th IAPR International Conference on Document Analysis and Recognition, 2017, pp. 39-44.

Liang et al., "Camera-based analysis of text and documents: a survey," Digital Object Identifier, International Journal on Document Analysis and Recognition, 2005, pp. 84-104.

Examination Report from European Application No. 20194730.6, dated Dec. 11, 2020.

Final Office Action from U.S. Appl. No. 16/824,518, dated Feb. 23, 2021.

Notice of Allowance from U.S. Appl. No. 16/824,518, dated Jun. 1, 2021.

Supplemental Notice of Allowance from U.S. Appl. No. 16/206,912, dated May 28, 2021.

Supplemental Notice of Allowance from U.S. Appl. No. 16/267,205, dated Jun. 9, 2021.

Thrasher et al., U.S. Appl. No. 17/348,584, filed Jun. 15, 2021.

Ma et al., U.S. Appl. No. 17/348,617, filed Jun. 15, 2021.

Notice of Allowance from U.S. Appl. No. 16/267,205, dated Mar. 12, 2021.

Notice of Allowance from U.S. Appl. No. 16/206,912, dated Mar. 8, 2021.

Supplemental Notice of Allowance from U.S. Appl. No. 16/206,912, dated Mar. 17, 2021.

Non-Final Office Action from U.S. Appl. No. 16/569,247, dated May 12, 2021.

(56) References Cited

OTHER PUBLICATIONS

Notice of Allowance from U.S. Appl. No. 16/206,912, dated Nov. 16, 2020.
Final Office Action from U.S. Appl. No. 15/394,731, dated Dec. 21, 2020.
Supplemental Notice of Allowance from U.S. Appl. No. 16/824,518, dated Jul. 15, 2021.
Non-Final Office Action from U.S. Appl. No. 15/394,731, dated Aug. 16, 2021.
Phillips, P., "Support Vector Machines Applied to Face Recognition," Advances in Neural Information Processing Systems, 1998, pp. 803-809, retrieved from https://papers.nips.cc/paper/1998/file/a2cc63e065705fe938a4dda49092966f-Paper.pdf.
Kung et al., "Biometric Authentication: A Machine Learning Approach," Matlab Projects, Chapter 1, 2004, 13 pages.
Zhao et al., "Face recognition: A literature survey," ACM Computing Surveys, vol. 35, No. 4, Dec. 2003, pp. 399-458.
Turk et al., "Face Recognition Using Eigenfaces," IEEE Computer Society Conference on Computer Vision and Pattern Recognition, 1991, pp. 586-591.
Joachims, T., "Transductive Inference for Text Classification Using Support Vector Machines," International Conference on Machine Learning, 1999, 10 pages, retrieved from https://www.cs.cornell.edu/people/tj/publications/joachims_99c.pdf.
Supplemental Notice of Allowance from U.S. Appl. No. 15/394,731, dated Mar. 30, 2022.
Final Office Action from U.S. Appl. No. 16/997,800, dated Apr. 11, 2022.
Corrected Notice of Allowance from U.S. Appl. No. 16/569,247, dated Mar. 16, 2022.
Examination Report from European Application No. 10741580.4, dated Feb. 28, 2022.
Notice of Allowance from U.S. Appl. No. 16/997,800, dated Jun. 27, 2022.
Non-Final Office Action from U.S. Appl. No. 17/006,636, dated Aug. 4, 2022.
Notice of Allowance from U.S. Appl. No. 16/569,247, dated Dec. 10, 2021.
Notice of Allowance from U.S. Appl. No. 15/394,731, dated Dec. 27, 2021.
Notice of Allowance from U.S. Appl. No. 16/267,205, dated Oct. 15, 2020.
Non-Final Office Action from U.S. Appl. No. 16/569,247, dated Oct. 29, 2020.
Notice of Allowance from U.S. Appl. No. 17/005,147, dated Jan. 25, 2023.
Corrected Notice of Allowance from U.S. Appl. No. 17/005,147, dated Mar. 2, 2023.
Ma et al., U.S. Appl. No. 18/114,876, filed Feb. 27, 2023.
Non-Final Office Action from U.S. Appl. No. 17/348,584, dated Apr. 12, 2023.
Ma et al., U.S. Appl. No. 18/134,473, filed Apr. 13, 2023.
Examination Report from European Application No. 14 861 942.2, dated Jul. 15, 2022.
Final Office Action from U.S. Appl. No. 15/396,306, dated Oct. 28, 2022.
Restriction Requirement from U.S. Appl. No. 17/348,584, dated Nov. 18, 2022.
Notice of Allowance from U.S. Appl. No. 17/006,636, dated Nov. 15, 2022.
Supplemental Notice of Allowance from U.S. Appl. No. 17/006,636, dated Nov. 25, 2022.
Notice of Allowance from U.S. Appl. No. 17/348,617, dated Jan. 18, 2023.
Notice of Allowance from U.S. Appl. No. 17/006,650, dated Dec. 23, 2022.
Notice of Allowance from U.S. Appl. No. 17/348,617, dated Apr. 21, 2023.
Supplemental Notice of Allowance from U.S. Appl. No. 17/348,617, dated May 16, 2023.

* cited by examiner

700

Detect a plurality of identifying features of an object depicted in a digital image, where the plurality of identifying features are located internally with respect to the object ~ 702

Project a location of one or more edges of the object based at least in part on the plurality of identifying features ~ 704

Detect a plurality of identifying features of an object depicted in a digital image, where the plurality of identifying features are located internally with respect to the object ~ 802

Reconstruct the digital image of the object within a three dimensional coordinate space based at least in part on some or all of the plurality of identifying features ~ 804

FIG. 8

CONTENT-BASED OBJECT DETECTION, 3D RECONSTRUCTION, AND DATA EXTRACTION FROM DIGITAL IMAGES

RELATED APPLICATIONS

This application is a continuation of U.S. patent application Ser. No. 16/194,201, filed Nov. 16, 2018, which is a continuation-in-part of U.S. patent application Ser. No. 16/151,090, filed Oct. 3, 2018, which is a continuation of U.S. patent application Ser. No. 15/234,993, filed Aug. 11, 2016, which claims the benefit of U.S. Provisional Patent Application No. 62/317,360, filed Apr. 1, 2016 and which is a continuation-in-part of U.S. patent application Ser. No. 14/932,902, filed Nov. 4, 2015 (granted Apr. 17, 2018 as U.S. Pat. No. 9,946,954), which is a continuation of U.S. patent application Ser. No. 14/491,901 filed Sep. 19, 2014 (granted Dec. 8, 2015 as U.S. Pat. No. 9,208,536), which claims the benefit of U.S. Provisional Patent Application No. 61/883,865. Priority is claimed to each of the foregoing applications, and the contents of which are herein incorporated by reference.

FIELD OF INVENTION

The present invention relates to digital image data capture and processing, and more particularly to detecting objects depicted in image and/or video data based on internally-represented features (content) as opposed to edges. The present invention also relates to reconstructing detected objects in a three-dimensional coordinate space so as to rectify image artifacts caused by distortional effects inherent to capturing image and/or video data using a camera. The present invention still further relates to extracting data from the detected object, with or without reconstruction thereof.

This application is a continuation of U.S. patent application Ser. No. 16/194,201, filed Nov. 16, 2018, which is a continuation-in-part of U.S. patent application Ser. No. 15/396,322, filed Dec. 30, 2016, which is a continuation-in-part of U.S. patent application Ser. No. 14/818,196, filed Aug. 4, 2015 (granted Sep. 5, 2017 as U.S. Pat. No. 9,754,164), which is a continuation of U.S. patent application Ser. No. 14/209,825, filed Mar. 13, 2014 (granted Apr. 12, 2016 as U.S. Pat. No. 9,311,531), which claims the benefit of U.S. Provisional Patent Application No. 61/780,747, filed Mar. 13, 2013. Priority is claimed to each of the foregoing applications, and the contents of which are herein incorporated by reference.

This application is a continuation of U.S. patent application Ser. No. 16/194,201, filed Nov. 16, 2018, which is a continuation-in-part of U.S. patent application Ser. No. 15/396,322, filed Dec. 30, 2016, which is a continuation-in-part of U.S. patent application Ser. No. 15/157,325, filed May 17, 2016 (granted Jun. 12, 2018 as U.S. Pat. No. 9,996,741), which is a continuation of U.S. patent application Ser. No. 13/802,226, filed Mar. 13, 2013 (granted May 31, 2016 as U.S. Pat. No. 9,355,312). Priority is claimed to each of the foregoing applications, and the contents of which are herein incorporated by reference.

BACKGROUND OF THE INVENTION

Digital images having depicted therein a document such as a letter, a check, a bill, an invoice, a credit card, a driver license, a passport, a social security card, etc. have conventionally been captured and processed using a scanner or multifunction peripheral coupled to a computer workstation such as a laptop or desktop computer. Methods and systems capable of performing such capture and processing are well known in the art and well adapted to the tasks for which they are employed.

However, in an era where day-to-day activities, computing, and business are increasingly performed using mobile devices, it would be greatly beneficial to provide analogous document capture and processing systems and methods for deployment and use on mobile platforms, such as smart phones, digital cameras, tablet computers, etc.

A major challenge in transitioning conventional document capture and processing techniques is the limited processing power and image resolution achievable using hardware currently available in mobile devices. These limitations present a significant challenge because it is impossible or impractical to process images captured at resolutions typically much lower than achievable by a conventional scanner. As a result, conventional scanner-based processing algorithms typically perform poorly on digital images captured using a mobile device.

In addition, the limited processing and memory available on mobile devices makes conventional image processing algorithms employed for scanners prohibitively expensive in terms of computational cost. Attempting to process a conventional scanner-based image processing algorithm takes far too much time to be a practical application on modern mobile platforms.

A still further challenge is presented by the nature of mobile capture components (e.g. cameras on mobile phones, tablets, etc.). Where conventional scanners are capable of faithfully representing the physical document in a digital image, critically maintaining aspect ratio, dimensions, and shape of the physical document in the digital image, mobile capture components are frequently incapable of producing such results.

Specifically, images of documents captured by a camera present a new line of processing issues not encountered when dealing with images captured by a scanner. This is in part due to the inherent differences in the way the document image is acquired, as well as the way the devices are constructed. The way that some scanners work is to use a transport mechanism that creates a relative movement between paper and a linear array of sensors. These sensors create pixel values of the document as it moves by, and the sequence of these captured pixel values forms an image. Accordingly, there is generally a horizontal or vertical consistency up to the noise in the sensor itself, and it is the same sensor that provides all the pixels in the line.

In contrast, cameras have many more sensors in a non-linear array, e.g., typically arranged in a rectangle. Thus, all of these individual sensors are independent, and render image data that is not typically of horizontal or vertical consistency. In addition, cameras introduce a projective effect that is a function of the angle at which the picture is taken. For example, with a linear array like in a scanner, even if the transport of the paper is not perfectly orthogonal to the alignment of sensors and some skew is introduced, there is no projective effect like in a camera. Additionally, with camera capture, nonlinear distortions may be introduced because of the camera optics.

Distortions and blur are particularly challenging when attempting to detect objects represented in video data, as the camera typically moves with respect to the object during the capture operation, and video data are typically characterized by a relatively low resolution compared to still images captured using a mobile device. Moreover, the motion of the camera may be erratic and occur within three dimensions, meaning the horizontal and/or vertical consistency associated with linear motion in a conventional scanner is not present in video data captured using mobile devices. Accordingly, reconstructing an object to correct for distortions, e.g. due to changing camera angle and/or position, within a three-dimensional space is a significant challenge.

Further still, as mobile applications increasingly rely on or leverage image data to provide useful services to customers, e.g. for downstream applications such as mobile banking, shopping, applying for services such as loans, opening accounts, authenticating identity, acquiring or renewing licenses, etc., capturing relevant information within image data is a desirable capability. However, often the detection of objects within the mobile image data is a challenging task, particularly where the object's edges may be missing, obscured, etc. within the captured image/video data. Since conventional detection techniques rely on detecting objects by locating edges of the object (i.e. boundaries between the object, typically referred to as the image "foreground" and the background of the image or video), missing or obscured object edges present an additional obstacle to consistent and accurate object detection.

In view of the challenges presented above, it would be beneficial to provide an image capture and processing algorithm and applications thereof that compensate for and/or correct problems associated with using a mobile device to capture and/or detect objects within image and/or video data, and reconstruct such objects within a three-dimensional coordinate space.

SUMMARY OF THE INVENTION

According to one embodiment, a computer-implemented method of detecting an object depicted in a digital image includes: detecting a plurality of identifying features of the object, wherein the plurality of identifying features are located internally with respect to the object; projecting a location of region(s) of interest of the object based on the plurality of identifying features, wherein each region of interest depicts content; building and/or selecting an extraction model configured to extract the content based at least in part on: the location of the region(s) of interest, the of identifying feature(s), or both the location of the one or more regions of interest and the plurality of identifying features; and extracting the some or all of the content from the digital image using the extraction model. At least a portion of one or more edges of the object is missing from the digital image.

According to another embodiment, a computer-implemented method of detecting an object depicted in a digital image includes: detecting a plurality of identifying features of the object, wherein the plurality of identifying features are located internally with respect to the object; projecting a location of region(s) of interest of the object based on the plurality of identifying features, wherein projecting the location of the one or more regions of interest of the object is based on a mapping of key points within some or all of the plurality of identifying features to key points of a reference image depicting an object belonging to a same class as the object depicted in the digital image, and wherein each region of interest depicts content; building and/or selecting an extraction model configured to extract the content based at least on: the location of the region(s) of interest, the of identifying feature(s), or both the location of the one or more regions of interest and the plurality of identifying features; and extracting the some or all of the content from the digital image using the extraction model.

According to yet another embodiment, a computer-implemented method of detecting an object depicted in a digital image includes: detecting a plurality of identifying features of the object, wherein the plurality of identifying features are located internally with respect to the object; cropping the digital image based at least in part on a projected location of one or more edges of the object, wherein the projected location of the one or more edges of the object is based at least in part on the plurality of identifying features; detecting one or more transitions between the background and the object within the cropped digital image; projecting a location of region(s) of interest of the object based on the plurality of identifying features, wherein each region of interest depicts content; building and/or selecting an extraction model configured to extract the content based at least in part on: the location of the region(s) of interest, the of identifying feature(s), or both the location of the one or more regions of interest and the plurality of identifying features; and extracting the some or all of the content from the digital image using the extraction model.

Corresponding system and computer program products are also disclosed.

Other aspects and embodiments of the invention will be appreciated based on reviewing the following descriptions in full detail.

BRIEF DESCRIPTION OF THE DRAWINGS

FIG. 7 is a flowchart of a method for detecting objects depicted in digital images based on internal features of the object, according to one embodiment.

FIG. 8 is a flowchart of a method for reconstructing objects depicted in digital images based on internal features of the object, according to one embodiment.

DETAILED DESCRIPTION

Figure 1:
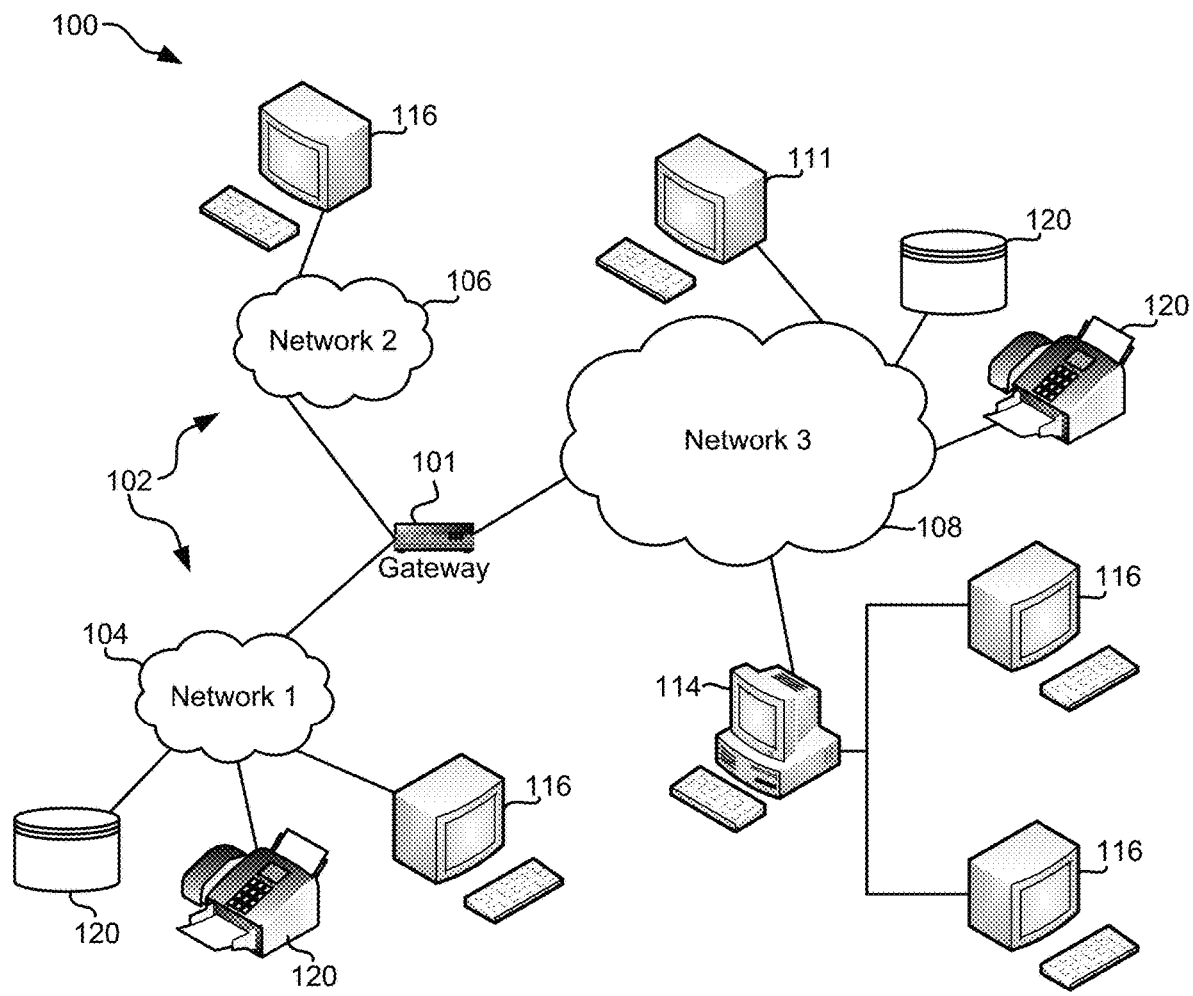
FIG. 1 illustrates a network architecture, in accordance with one embodiment.

The following description is intended to illustrate the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The present application refers to image processing. In particular, the present application discloses systems, methods, and computer program products configured to detect and reconstruct objects depicted in digital images from a non-rectangular shape to a substantially rectangular shape, or preferably a rectangular shape. Even more preferably, this is accomplished based on evaluating the internal features of the object(s) rather than detecting object edges and reconstructing a particular shape based on edge contours.

According to one embodiment, a computer-implemented method of detecting an object depicted in a digital image and extracting data therefrom includes: detecting, using a hardware processor, a plurality of identifying features of the object, wherein the plurality of identifying features are located internally with respect to the object; projecting, using the hardware processor, a location of one or more regions of interest of the object based at least in part on the plurality of identifying features, wherein each region of interest depicts content; building and/or selecting, using the hardware processor, an extraction model configured to extract some or all of the content based at least in part on: the location of the one or more regions of interest, the plurality of identifying features, or both the location of the one or more regions of interest and the plurality of identifying features; and extracting, using the hardware processor, the some or all of the content from the digital image using the extraction model.

According to another embodiment, a computer program product for detecting an object depicted in a digital image and extracting data therefrom includes a computer readable medium having stored thereon computer readable program instructions configured to cause a processor, upon execution thereof, to: detect, using a hardware processor, a plurality of identifying features of the object, wherein the plurality of identifying features are located internally with respect to the object; project, using the hardware processor, a location of one or more regions of interest of the object based at least in part on the plurality of identifying features, wherein each region of interest depicts content; build and/or select, using the hardware processor, an extraction model configured to extract some or all of the content based at least in part on: the location of the one or more regions of interest, the plurality of identifying features, or both the location of the one or more regions of interest and the plurality of identifying features; and extract, using the hardware processor, the some or all of the content from the digital image using the extraction model.

According to yet another embodiment, a system for detecting an object depicted in a digital image and extracting data therefrom includes a hardware processor and logic embodied with and/or executable by the hardware processor. The logic is configured to cause the processor, upon execution thereof, to: detect, using a hardware processor, a plurality of identifying features of the object, wherein the plurality of identifying features are located internally with respect to the object; project, using the hardware processor, a location of one or more regions of interest of the object based at least in part on the plurality of identifying features, wherein each region of interest depicts content; build and/or select, using the hardware processor, an extraction model configured to extract some or all of the content based at least in part on: the location of the one or more regions of interest, the plurality of identifying features, or both the location of the one or more regions of interest and the plurality of identifying features; and extract, using the hardware processor, the some or all of the content from the digital image using the extraction model.

The following definitions will be useful in understanding the inventive concepts described herein, according to various embodiments. The following definitions are to be considered exemplary, and are offered for purposes of illustration to provide additional clarity to the present disclosures, but should not be deemed limiting on the scope of the inventive concepts disclosed herein.

Figure 6A:
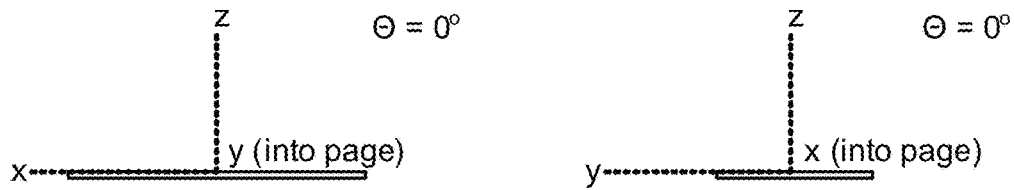
FIG. 6A is a simplified schematic showing a coordinate system for measuring capture angle, according to one embodiment.
Figure 6B:
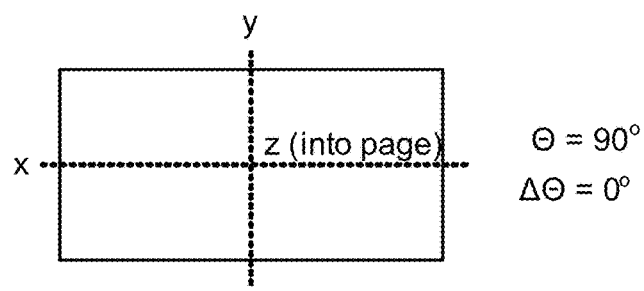
FIG. 6B depicts an exemplary schematic of a rectangular object captured using a capture angle normal to the object, according to one embodiment.
Figure 6C:
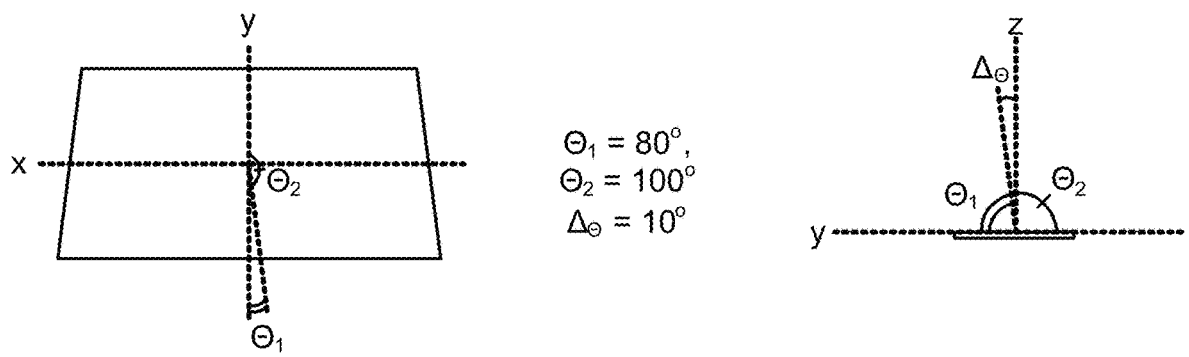
FIG. 6C depicts an exemplary schematic of a rectangular object captured using a capture angle slightly skewed with respect to the object, according to one embodiment.
Figure 6D:
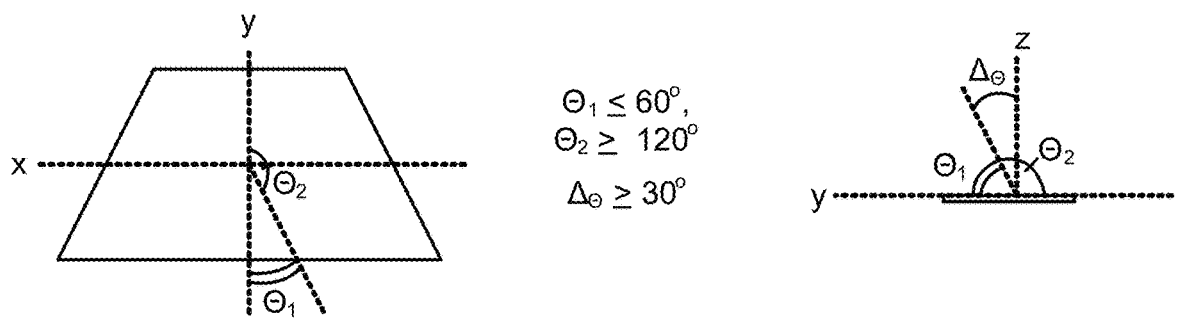
FIG. 6D depicts an exemplary schematic of a rectangular object captured using a capture angle significantly skewed with respect to the object, according to one embodiment.

As referred to henceforth, a "quadrilateral" is a four-sided figure where (1) each side is linear, and (2) adjacent sides form vertices at the intersection thereof. Exemplary quadrilaterals are depicted in FIGS. 6C and 6D below, according to two illustrative embodiments.

A "parallelogram" is a special type of quadrilateral, i.e. a four-sided figure where (1) each side is linear, (2) opposite sides are parallel, and (3) adjacent sides are not necessarily perpendicular, such that vertices at the intersection of adjacent sides form angles having values that are not necessarily 90°.

A "rectangle" or "rectangular shape" is a special type of quadrilateral, which is defined as a four-sided figure, where (1) each side is linear, (2) opposite sides are parallel, and (3) adjacent sides are perpendicular, such that an interior angle formed at the vertex between each pair of adjacent sides is a right-angle, i.e. a 90° angle. An exemplary rectangle is depicted in FIG. 6B, according to one illustrative embodiment.

Moreover, as referred-to herein "rectangles" and "rectangular shapes" are considered to include "substantially rectangular shapes", which are defined as a four-sided shape where (1) each side is predominantly linear (e.g. at least 90%, 95%, or 99% of each side's length, in various embodiments, is characterized by a first-order polynomial (such as y=mx+b), (2) each pair of adjacent sides form an interior angle having a value θ, where θ is approximately 90° (e.g. θ satisfies the relationship: 85°≤θ≤95°)) at either (a) a vertex between two adjacent sides, (b) a vertex between a projection of the predominantly linear portion of one side and an adjacent side, or (c) a vertex between a projection of the predominantly linear portion of one side and a projection of the predominantly linear portion of an adjacent side.

A "non-rectangular shape" as referred to herein includes any shape that is not either a "rectangular shape" or a "substantially rectangular shape" as defined above. In preferred embodiments, a "non-rectangular shape" is a "tetragon," which as referred to herein is a four-sided figure, where: (1) each side is characterized in whole or in part by an equation selected from a chosen class of functions (e.g. selected from a class of polynomials preferably ranging from zeroth order to fifth order, more preferably first order to third order polynomials, and even more preferably first order to second order polynomials), and (2) adjacent sides of the figure form vertices at the intersection thereof.

Images (e.g. pictures, figures, graphical schematics, single frames of movies, videos, films, clips, etc.) are preferably digital images captured by cameras, especially cameras of mobile devices. As understood herein, a mobile device is any device capable of receiving data without having power supplied via a physical connection (e.g. wire, cord, cable, etc.) and capable of receiving data without a physical data connection (e.g. wire, cord, cable, etc.). Mobile devices within the scope of the present disclosures include exemplary devices such as a mobile telephone, smartphone, tablet, personal digital assistant, iPod®, iPad®, BLACKBERRY® device, etc.

However, as it will become apparent from the descriptions of various functionalities, the presently disclosed mobile image processing algorithms can be applied, sometimes with certain modifications, to images coming from scanners and multifunction peripherals (MFPs). Similarly, images processed using the presently disclosed processing algorithms may be further processed using conventional scanner processing algorithms, in some approaches.

Of course, the various embodiments set forth herein may be implemented utilizing hardware, software, or any desired combination thereof. For that matter, any type of logic may be utilized which is capable of implementing the various functionality set forth herein.

One benefit of using a mobile device is that with a data plan, image processing and information processing based on captured images can be done in a much more convenient, streamlined and integrated way than previous methods that relied on presence of a scanner. However, the use of mobile devices as document(s) capture and/or processing devices has heretofore been considered unfeasible for a variety of reasons.

In one approach, an image may be captured by a camera of a mobile device. The term "camera" should be broadly interpreted to include any type of device capable of capturing an image of a physical object external to the device, such as a piece of paper. The term "camera" does not encompass a peripheral scanner or multifunction device. Any type of camera may be used. Preferred embodiments may use cameras having a higher resolution, e.g. 8 MP or more, ideally 12 MP or more. The image may be captured in color, grayscale, black and white, or with any other known optical effect. The term "image" as referred to herein is meant to encompass any type of data corresponding to the output of the camera, including raw data, processed data, etc.

The description herein is presented to enable any person skilled in the art to make and use the invention and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

General Computing and Networking Concepts

In particular, various embodiments of the invention discussed herein are implemented using the Internet as a means of communicating among a plurality of computer systems. One skilled in the art will recognize that the present invention is not limited to the use of the Internet as a communication medium and that alternative methods of the invention may accommodate the use of a private intranet, a Local Area Network (LAN), a Wide Area Network (WAN) or other means of communication. In addition, various combinations of wired, wireless (e.g., radio frequency) and optical communication links may be utilized.

The program environment in which one embodiment of the invention may be executed illustratively incorporates one or more general-purpose computers or special-purpose devices such hand-held computers. Details of such devices (e.g., processor, memory, data storage, input and output devices) are well known and are omitted for the sake of clarity.

It should also be understood that the techniques of the present invention might be implemented using a variety of technologies. For example, the methods described herein may be implemented in software running on a computer system, or implemented in hardware utilizing one or more processors and logic (hardware and/or software) for performing operations of the method, application specific integrated circuits, programmable logic devices such as Field Programmable Gate Arrays (FPGAs), and/or various combinations thereof. In one illustrative approach, methods described herein may be implemented by a series of computer-executable instructions residing on a storage medium such as a physical (e.g., non-transitory) computer-readable medium. In addition, although specific embodiments of the invention may employ object-oriented software programming concepts, the invention is not so limited and is easily adapted to employ other forms of directing the operation of a computer.

The invention can also be provided in the form of a computer program product comprising a computer readable storage or signal medium having computer code thereon, which may be executed by a computing device (e.g., a processor) and/or system. A computer readable storage medium can include any medium capable of storing computer code thereon for use by a computing device or system, including optical media such as read only and writeable CD and DVD, magnetic memory or medium (e.g., hard disk drive, tape), semiconductor memory (e.g., FLASH memory and other portable memory cards, etc.), firmware encoded in a chip, etc.

A computer readable signal medium is one that does not fit within the aforementioned storage medium class. For example, illustrative computer readable signal media communicate or otherwise transfer transitory signals within a system, between systems e.g., via a physical or virtual network, etc.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, hand-held computer, printer or any other type of logic. It should be noted that a user device 111 may also be directly coupled to any of the networks, in one embodiment.

A peripheral 120 or series of peripherals 120, e.g. facsimile machines, printers, networked storage units, etc., may be coupled to one or more of the networks 104, 106, 108. It should be noted that databases, servers, and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates a MAC OS environment, a UNIX system which virtually hosts a MICROSOFT WINDOWS environment, a MICROSOFT WINDOWS system which emulates a MAC OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data processing and/or storage, servers, etc., are provided to any system in the cloud, preferably in an on-demand relationship, thereby allowing access and distribution of services across many computing systems. Cloud computing typically involves an Internet or other high speed connection (e.g., 4G LTE, fiber optic, etc.) between the systems operating in the cloud, but other techniques of connecting the systems may also be used.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates a MAC OS environment, a UNIX system which virtually hosts a MICROSOFT WINDOWS environment, a MICROSOFT WINDOWS system which emulates a MAC OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data processing and/or storage, servers, etc., are provided to any system in the cloud, preferably in an on-demand relationship, thereby allowing access and distribution of services across many computing systems. Cloud computing typically involves an Internet or other high speed connection (e.g., 4G LTE, fiber optic, etc.) between the systems operating in the cloud, but other techniques of connecting the systems may also be used.

Figure 2:
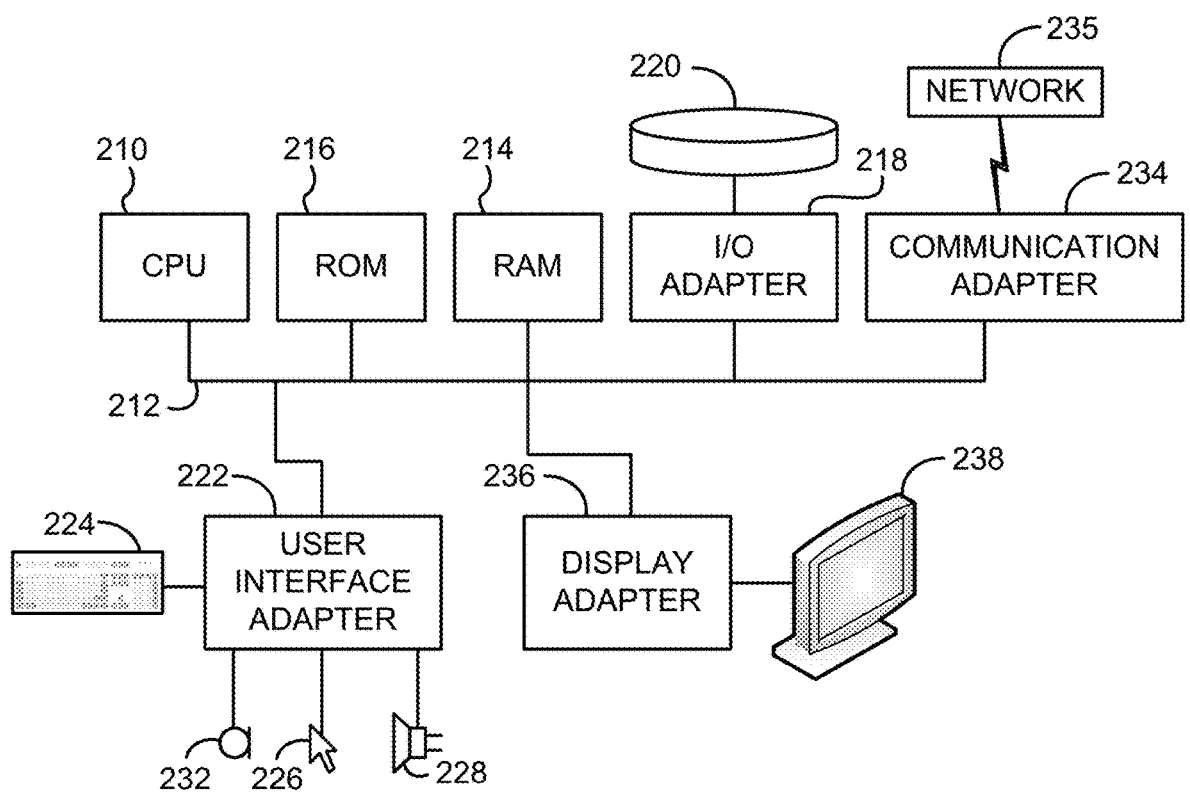
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Mobile Image Capture

Various embodiments of a Mobile Image Capture and Processing algorithm, as well as several mobile applications configured to facilitate use of such algorithmic processing within the scope of the present disclosures are described below. It is to be appreciated that each section below describes functionalities that may be employed in any combination with those disclosed in other sections, including any or up to all the functionalities described herein. Moreover, functionalities of the processing algorithm embodiments as well as the mobile application embodiments may be combined and/or distributed in any manner across a variety of computing resources and/or systems, in several approaches.

An application may be installed on the mobile device, e.g., stored in a nonvolatile memory of the device. In one approach, the application includes instructions to perform processing of an image on the mobile device. In another approach, the application includes instructions to send the image to one or more non-mobile devices, e.g. a remote server such as a network server, a remote workstation, a cloud computing environment, etc. as would be understood by one having ordinary skill in the art upon reading the present descriptions. In yet another approach, the application may include instructions to decide whether to perform some or all processing on the mobile device and/or send the image to the remote site. Examples of how an image may be processed are presented in more detail below.

In one embodiment, there may be no difference between the processing that may be performed on the mobile device and a remote server, other than speed of processing, constraints on memory available, etc. Moreover, there may be some or no difference between various user interfaces presented on a mobile device, e.g. as part of a mobile application, and corresponding user interfaces presented on a display in communication with the non-mobile device.

In other embodiments, a remote server may have higher processing power, more capabilities, more processing algorithms, etc. In yet further embodiments, the mobile device may have no image processing capability associated with the application, other than that required to send the image to the remote server. In yet another embodiment, the remote server may have no image processing capability relevant to the platforms presented herein, other than that required to receive the processed image from the remote server. Accordingly, the image may be processed partially or entirely on the mobile device, and/or partially or entirely on a remote server, and/or partially or entirely in a cloud, and/or partially or entirely in any part of the overall architecture in between. Moreover, some processing steps may be duplicated on different devices.

Which device performs which parts of the processing may be defined by a user, may be predetermined, may be determined on the fly, etc. Moreover, some processing steps may be re-performed, e.g., upon receiving a request from the user. Accordingly, the raw image data, partially processed image data, or fully processed image data may be transmitted from the mobile device, e.g., using a wireless data network, to a remote system. Image data as processed at a remote system may be returned to the mobile device for output and/or further processing.

In a further approach, the image may be partitioned, and the processing of the various parts may be allocated to various devices, e.g., ½ to the mobile device and ½ to the remote server, after which the processed halves are combined.

In one embodiment, selection of which device performs the processing may be based at least in part on a relative speed of processing locally on the mobile device vs. communication with the server.

In one approach, a library of processing functions may be present, and the application on the mobile device or the application on a remote server simply makes calls to this library, and essentially the meaning of the calls defines what kind of processing to perform. The device then performs that processing and outputs the processed image, perhaps with some corresponding metadata.

Any type of image processing known in the art and/or as newly presented herein may be performed in any combination in various embodiments.

Referring now to illustrative image processing, the camera can be considered an area sensor that captures images, where the images may have any number of projective effects, and sometimes non-linear effects. The image may be processed to correct for such effects. Moreover, the position and boundaries of the document(s) in the image may be found during the processing, e.g., the boundaries of one or more actual pages of paper in the background surrounding the page(s). Because of the mobile nature of various embodiments, the sheet of paper may be lying on just about anything. This complicates image analysis in comparison to processing images of documents produced using a scanner, because scanner background properties are constant and typically known, whereas mobile capture backgrounds may vary almost infinitely according to the location of the document and the corresponding surrounding textures captured in the image background, as well as because of variable lighting conditions.

Accordingly, the non-uniformity of the background of the surface on which the piece of paper may be positioned for capture by the camera presents one challenge, and the non-linear and projective effects present additional challenges. Various embodiments overcome these challenges, as will soon become apparent.

In one exemplary mode of operation, an application on the mobile device may be initiated, e.g., in response to a user request to open the application. For example, a user-selection of an icon representing the application may be detected.

In some approaches, a user authentication may be requested and/or performed. For example, a user ID and password, or any other authentication information, may be requested and/or received from the user.

In further approaches, various tasks may be enabled via a graphical user interface of the application. For example, a list of tasks may be presented. In such case, a selection of one of the tasks by the user may be detected, and additional options may be presented to the user, a predefined task may be initiated, the camera may be initiated, etc.

Content-Based Object Detection

An image may be captured by the camera of the mobile device, preferably upon receiving some type of user input such as detecting a tap on a screen of the mobile device, depression of a button on the mobile device, a voice command, a gesture, etc. Another possible scenario may involve some level of analysis of sequential frames, e.g. from a video stream. Sequential frame analysis may be followed by a switch to capturing a single high-resolution image frame, which may be triggered automatically or by a user, in some approaches. Moreover, the trigger may be based on information received from one or more mobile device sensors. For example, in one embodiment an accelerometer in or coupled to the mobile device may indicate a stability of the camera, and the application may analyze low-resolution video frame(s) for presence of an object of interest. If an object is detected, the application may perform a focusing operation and acquire a high-resolution image of the detected object. Either the low- or high-resolution image may be further processed, but preferred embodiments utilize the high-resolution image for subsequent processing.

In more approaches, switching to single frame mode as discussed above may be unnecessary, particularly for smaller objects, in particular documents such as business cards, receipts, credit cards, identification documents such as driver licenses and passports, etc. To increase processing rate and reduce consumption of processing resources, object type identification may facilitate determining whether or not to switch to single frame mode and/or capture a high-resolution image for processing.

As noted above, conventional techniques for detecting objects in image and/or video data generally rely on detecting the edges of the object, i.e. transitions between the background and foreground (which depicts the object) of the image or video data. For instance, edges may be detected based on locating one or more lines (e.g. four lines intersecting to form corners of a substantially rectangular object such as a document) of pixels characterized by a sharp transition in pixel intensity between the background and foreground.

However, where edges are missing or obscured, the conventional edge detection approach is not reasonably accurate or consistent in detecting objects within image and/or video data. Similar challenges exist in images where the object for which detection is desired is set against a complex background (e.g. a photograph or environmental scene) since detecting sharp transitions in intensity is likely to generate many false positive predictions of the location of the object. Accordingly, a new approach is presented via the inventive concepts disclosed herein, and this inventive approach advantageously does not rely on detecting object edges to accomplish object detection within the image and/or video data.

In particular, the presently disclosed inventive concepts include using features of the object other than the edges, e.g. content depicted within a document, to serve as identifying characteristics from which object detection may be accomplished. While the present descriptions set forth several exemplary embodiments of object detection primarily with reference to features of documents, it should be understood that these concepts are equally applicable to nearly any type of object, and the techniques discussed herein may be utilized to detect nearly any type of object for which a suitable set of identifying features are present across various exemplars of that object type.

Turning now to exemplary embodiments in which the detected object is a document, e.g. a form, a passport, a driver license, a credit card, a business card, a check, a receipt etc., and consistent with the notion that identifying features should be present across various (preferably all) exemplars of a particular document type, content that is common to documents of that type may serve as a suitable identifying feature. In some approaches, edges of the detected object may be cut off, obscured, or otherwise not identifiable within the image. Indeed, the presently disclosed inventive concepts offer the particular advantage that detection of objects may be accomplished independent of whether object edges are identifiable within the image data. Accordingly, the presently disclosed inventive concepts effectuate an improvement to systems configured for object recognition/detection within image data.

In some approaches, when the object or document is known to depict particular content in a particular location, e.g. a barcode, MICR characters for a check, MRZ characters on passports and certain types of identifying documents, etc., then these reference content may be employed to facilitate detecting the object within image and/or video data. In many cases, reference content position and/or content is defined by some sort of standard. In various embodiments, it is accordingly advantageous to leverage a priori knowledge regarding the location, size, orientation, etc. of reference content within an image to project the location of document edges based on the reference content as depicted in the image and/or video data.

However, not all objects include such reference content. Accordingly, in more embodiments, content such as internal lines, symbols (e.g. small images like icons which preferably contain rich texture information, for instance, for a fingerprint, the ridge pattern, especially, the cross points of two lines, etc.), text characters, etc. which appears on substantially all documents of a particular type is eligible for use as an identifying feature. According to the present descriptions, such content may also be referred to as "boilerplate content."

Boilerplate content may be determined manually, e.g. based on a user defining particular feature zones within a reference image, in some approaches. For instance, a user may define particular regions such as those designated in FIG. 3A by dashed-line bounding boxes. In a particularly preferred approach, the particular regions defined by the user may include a subset of the regions shown in FIG. 3A, most preferably those regions exhibiting a shading within the bounding box (e.g. for a California driver license, state name "CALIFORNIA," expiration date "EXP," first name "FN," last name "LN," date of birth "DOB," sex "SEX," height "HGT," eye color "EYES," weight "WGT," and document discriminator "DD" field designators). In various approaches, the feature zones may include boilerplate text, e.g. regions 302 and/or non-textual identifying features such as logos, lines, intersecting lines, shapes, holograms, designs, drawings, etc. such as represented in region 304 of FIG. 3A, according to one embodiment.

Upon reading the present descriptions, skilled artisans will appreciate that the portions of the document obscured by white rectangles are redactions to protect sensitive information, and should not be considered feature zones within the scope of the presently disclosed inventive concepts. Indeed, by way of contrast to the boilerplate content referenced and shown above, the content redacted from FIG. 3A varies from driver license to driver license, and therefore is not suitable for designating or locating identifying features common to all (or most) driver licenses for a particular state.

Variable content may therefore be understood as any content that is not boilerplate content, and commonly includes text and photographic features of a document. According to preferred embodiments, content-based detection and reconstruction of objects within image data as disclosed herein is based on boilerplate content, and not based on variable content.

Figure 3A:
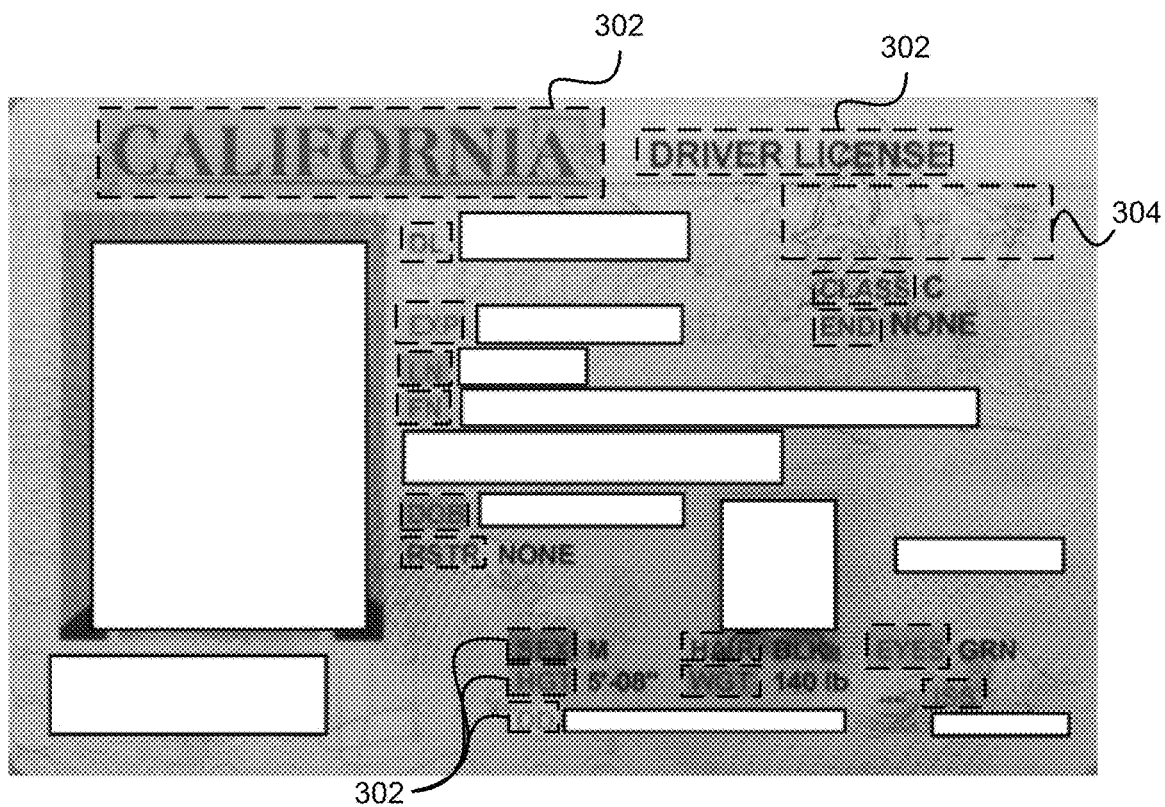
FIG. 3A is a digital image of a document including a plurality of designated feature zones, according to one embodiment.

Although the exemplary embodiment shown in FIG. 3A is a driver license, this is merely illustrative of the type of feature zones that may be designated by a user for purposes of locating and leveraging identifying features as described herein. In other document types, any equivalent text, especially field designators, may be utilized.

For instance on credit or debit cards a region depicting a name of the issuing entity (e.g. VISA, Bank of America, etc.) may be a suitable feature zone, or a region depicting a logo corresponding to the issuing entity, a portion of the card background, a portion of the card depicting a chip (e.g. for a smartcard, an EMV or other equivalent chip), etc. as would be understood by a person having ordinary skill in the art upon reading the present descriptions.

For checks, suitable feature zones may include field designators such as the "MEMO" region of the check, Payee designator "PAY TO THE ORDER OF," boilerplate text such as bank name or address, etc. Similarly, a region including borders of the bounding box designating the numerical payment amount for the check may be a suitable feature zone, in more embodiments.

Similarly, for identification documents such as government-issued IDs including social security cards, driver licenses, passports, etc. feature zones may include field designators that appear on the respective type of identification document, may include text such as the document title (e.g. "United States of America," "Passport," "Social Security," etc.), may include a seal, watermark, logo, hologram, symbol, etc. depicted on the identifying document, or other suitable static information depicted on a same location and in a same manner on documents of the same type.

For forms, again field designators are exemplary feature zones suitable for locating identifying features, as well as lines (particularly intersecting lines or lines forming a vertex), boxes, etc. as would be understood by a person having ordinary skill in the art upon reading the present descriptions.

Preferably, the feature zones defined by the user are defined within a reference image, i.e. an image representing the object according to a preferred or desired capture angle, zoom level, object orientation, and most preferably omitting background textures. Advantageously, defining the feature zones in a reference image significantly reduces the amount of training data necessary to accomplish efficient, accurate, and precise object detection and three-dimensional reconstruction. Indeed, it is possible to utilize a single training example such as shown in FIG. 3A in various embodiments. Reconstruction shall be discussed in further detail below.

To determine identifying features within the feature zones, or within the image as a whole, a feature vector-based approach is preferably implemented. As understood herein, a feature vector is an n-dimensional vector representing characteristics of a pixel within digital image and/or video data. The feature vector may include information representative of the pixel intensity in one or more color channels, pixel brightness, etc. as would be understood by a person having ordinary skill in the art upon reading the present descriptions.

Figure 3B:
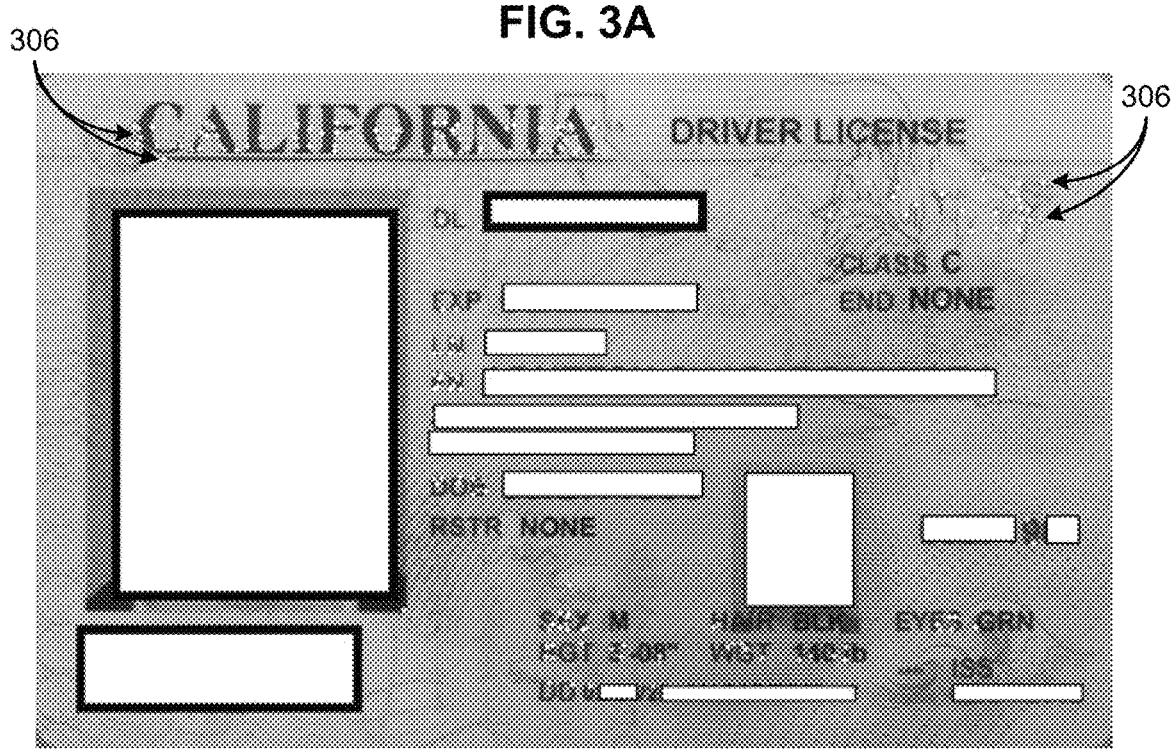
FIG. 3B is a digital image of a document including a plurality of designated identifying features, according to one embodiment.

Preferably, identifying features are characterized by a pixel in a small window of pixels (e.g. 8×8, 15×15, or other suitable value which may be configured based on image resolution) exhibiting a sharp transition in intensity. The identifying features may be determined based on analyzing the feature vectors of pixels in the small window, also referred to herein as a "patch." Frequently, these patches are located in regions including connected components (e.g. characters, lines, etc.) exhibiting a bend or intersection, e.g. as illustrated in FIG. 3B via identifying features 306 (white dots).

Of course, identifying features and/or feature zones may also be determined automatically without departing from the scope of the presently disclosed inventive concepts, but it should be noted that such approaches generally require significantly more training examples than approaches in which feature zones are defined manually in a reference image. Automatically identifying feature zones may also result in a series of identifying features 306 as shown in FIG. 3B, in some approaches.

The aim of automatic feature zone discovery is to find feature points without manually labeling. For instance, in one exemplary embodiment automatically identifying feature zones may include one or more of the following features and/or operations.

In one approach, the algorithm of selecting feature points involves two passes. The first pass of the algorithm includes: pair matching, designation of matching points; determining the set of most frequently used matching points; and selecting the best image index.

Pair matching may involve assuming a set of cropped images, for instance, assume a set of ten cropped images denoted by $c_1, c_2, c_3, \ldots c_{10}$, where at least one image is a reference image. From the assumed set, form a set of image pairs preferably including the reference as one of the images in each image pair. For instance if $c_1$ is used as the reference image, image pairs may include $(c_1, c2), (c_1, c3) \ldots (c_1, c_{10})$. In addition, for each pair $(c_1, c_k)$ (k=2 ... 10) pair matching includes finding matching key points between the images, e.g. as described above.

Designating matching points may involve denoting the set of matching points appearing in image $c_1$ as $S_k$, i.e., the set $S_k$ includes the set of points in image $c_1$ that match to their corresponding points in image $c_k$. Designating matching points may also involve denoting the set of matching points in image $c_k$ that correspond to the matching points in $S_k$ as the set $T_k$.

Finding the most frequently used points $S_k$(k=2, 3 ... 10) may, in turn, include the following. For each point in $\{S_k\}$(k=2, 3 ... 10), compute the frequency with which the point is used in $\{S_k\}$. If the frequency is above a threshold, for example, 35%, the point is labeled as a "most frequently used" point. In this way, the set of "most frequently used" points in image $c_1$ may be determined, and this set of points is preferably used as the "automatically selected" feature points in image $c_1$. The first pass of the automatic feature identification algorithm may also include denoting the selected most commonly used points for image $c_k$, as $m_k$.

Selecting the best image, in various approaches, may include determining the image with the best image index, i.e. the image exhibiting the maximum value of $m_k$(k=1, 2 ... 10) among images $c_1, c_2, \ldots c_{10}$.

FIG. 3B shows exemplary points 306 automatically selected by implementing the above algorithm, according to one embodiment.

However, in some approaches the above algorithm may generate feature point sets that are more conservative, which means that although the precision may be high, the recall may be low. Low recall can be problematic when attempting to match images with a small number of identifying features, superimposed against a particularly complex background, etc. as would be understood by a person having ordinary skill in the art upon reading the present disclosures. Accordingly, in some approaches the automatic feature discovery process may include a second pass aimed at increasing recall of feature point selection.

In a preferred embodiment, the second pass may proceed as follows. Without loss of any generality, suppose that the best image index is 1, that $m_1$ has the maximum value among different values of $m_k$ (k=1, 2 . . . 10), and that this image index represents an undesirably low recall rate. Accordingly, to improve recall, extend the set $m_1$ by adding more selected feature points in image c1. The added features may be characterized by a frequency less than the frequency threshold mentioned above with regard to the first pass, in some embodiments.

Figure 3C:
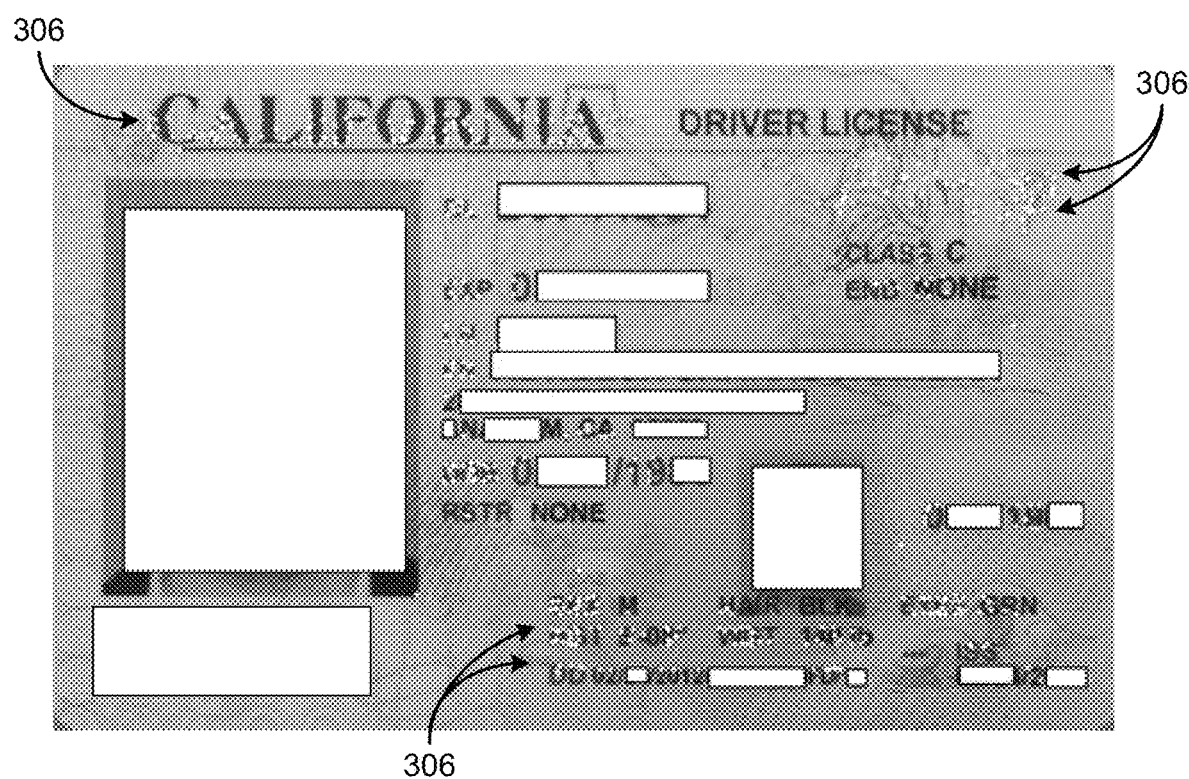
FIG. 3C is a digital image of a document including an extended set of the plurality of designated identifying features, according to another embodiment.

Note that the points in the set $m_k$ belongs to image $c_k$. For each $m_k$ (k=2 . . . 10), find the corresponding matching points in $c_1$. Denote as the set of corresponding feature point as $v_k$ for each $m_k$ where (k=2, 3 . . . 10). The final extended set of selected feature points for image $c_1$ may be defined as the union of $m_1$, $v_2$, $v_3$ . . . and $v_{10}$. The extended set of selected feature points is shown in FIG. 3C, according to one embodiment. Compared with FIG. 3B, the result shown in FIG. 3C contains more feature points, reflecting the improved recall of the second pass.

It should be noted that, in some approaches, automatic feature zone discovery may be characterized by a systematic bias when operating on cropped images. When observing the layout of text zones or texture zones in different cropped images of the same object, or objects in the same category, there are often variations in layout. There are about 4% to 7% relative changes in locations between different images. The reason for these variations was not only varying angles or 3D distortions, but also due to error inherent to the manufacturing process. In other words, the locations of particular features often are printed at different positions, so that even a scanned image of two different objects of the same type could exhibit some shift in feature location and/or appearance.

The above problem means the generated models may contain systematic bias. In preferred approaches, it is therefore advantageous to implement an algorithm to compensate for such bias. For instance, the bias may be estimated by the mean value of point shifts in different pair images. For instance, if $c_1$ is the best selected image. The average value of point shift between each pair image $(c_1, c_2)$, $(c_1, c_3)$ . . . $(c_1, c_{10})$ is estimated as the bias. Using this approach, it is possible to account for bias inherent in the automatic feature zone discovery process as described herein.

Feature vectors may be defined using a suitable algorithm, and in one embodiment a Binary Robust Independent Elementary Feature (BRIEF) is one suitable method to define a feature vector or descriptor for a pixel in an image. BRIEF uses grayscale image data as input, but in various embodiments other color depth input image data, and/or other feature vector defining techniques, may be utilized without departing from the scope of the present descriptions.

In one embodiment, the first step in this algorithm is to remove noise from the input image. This may be accomplished using a low-pass filter to remove high frequency noise, in one approach.

The second step is the selection of a set of pixel pairs in the image patch around a pixel. For instance, in various approaches pixel pairs may include immediately adjacent pixels in one or more of four cardinal directions (up, down, left, and right) and/or diagonally adjacent pixels.

The third step is the comparison of image intensities of each pixel pair. For instance, for a pair of pixels (p, q), if the intensity at pixel p is less than that at pixel q, the comparison result is 1. Otherwise, the result of the comparison is 0. These comparison operations are applied to all selected pixel pairs, and a feature vector for this image patch is generated by concatenating these 0/1 values in a string.

Assuming a patch comprising 64 pixels, the patch feature vector can have a length of 128, 256, 512, etc. in various approaches and depending on the nature of the comparison operations. In a preferred embodiment, the feature vector of the patch has a length of 256, e.g. for a patch comprising a square 8 pixels long on each side and in which four comparisons are performed for each pixel in the patch (left, right, upper and lower neighbor pixels).

A patch descriptor is a representation of a feature vector at a pixel in an image. The shape of a patch around a pixel is usually square or rectangular, but any suitable shape may be employed in various contexts or applications, without departing from the scope of the presently disclosed inventive concepts.

In some embodiments, and as noted above the value of each element in a feature vector descriptive of the patch is either 1 or 0, in which case the descriptor is a binary descriptor. Binary descriptors can be represented by a string of values, or a "descriptor string."

As described herein, a descriptor string is analogous to a word in natural language. It can also be called a "visual word." Similarly, an image is analogous to a document which is characterized by including a particular set of visual words. These visual words include features that are helpful for tasks such as image alignment and image recognition. For instance, for image alignment, if there are distinctive visual words in two images, aligning the images based on matching the visual words is easier than attempting to align the images de novo.

The distance between two descriptor strings can be measured by an edit distance or a Hamming distance, in alternative embodiments. Determining distance is a useful indicator of whether two different images, e.g. a reference image and a test image, depict similar content at particular positions. Thus, two images with very small distance between descriptor strings corresponding to identifying features of the respective images are likely to match, especially if the spatial distribution of the proximate identifying features is preserved between the images.

In the original implementation of a BRIEF descriptor algorithm for defining patch feature vectors, there are no patch orientations, which means that the descriptor is not rotation invariant. However, patch orientations are important to generate patch descriptors which are invariant to image rotations. Accordingly, in preferred approaches the feature vector, e.g. BRIEF descriptors, are enhanced with patch orientations which can be estimated using patch momentum. Patch momentum may be analyzed using any suitable technique that would be understood by a person having ordinary skill in the art upon reading the present disclosures.

In one embodiment, an "oriented Features from Accelerated Segment Test (FAST) and rotated BRIEF" (ORB) algorithm may be employed to enhance descriptors with orientation information. After getting the patch orientations, each descriptor is normalized by rotating the image patch with the estimated rotation angle.

As noted above regarding FIGS. 3A-3C, in preferred approaches the image includes one or more identifying features 306, which are characterized by a sharp transition in pixel intensity within a patch. Accordingly, the position of these identifying features 306 (which may also be considered distinctive visual words or key points) is determined.

Key point selection includes finding pixels in an image that have distinctive visual features. These pixels with distinctive features are at positions where image intensities change rapidly, such as corners, stars, etc. Theoretically speaking, every pixel in an image can be selected as a key point. However, there may be millions of pixels in an image, and using all pixels in image matching is very computationally intensive, without providing a corresponding improvement to accuracy. Therefore, distinctive pixels, which are characterized by being in a patch exhibiting a rapid change in pixel intensity, are a suitable set of identifying features with which to accurately match images while maintaining reasonable computational efficiency. In one embodiment, a FAST (Features from Accelerated Segment Test) algorithm may be implemented to select key points in image data and/or video data.

In various approaches, image descriptors that are described in the previous sections are not scale invariant. Therefore, the scale of a training image and a testing image should be the same in order to find the best match. For a reference image, a priori knowledge regarding the physical size of the object and image resolution may be available. In such embodiments, it is possible and advantageous to estimate the DPI in the reference image. Notably, in some approaches using a high resolution (e.g. 1920×1080 or greater, 200 DPI or greater) training image may produce too many key points which will slow down image matching process.

In order to optimize the matching time and accuracy, an appropriate reduced DPI level of image/video data is used, in some approaches. Accordingly, for high resolution training images, it is beneficial to scale down to a smaller image resolution, e.g. with a specific DPI level. For instance, the reduced DPI level is 180 in one embodiment determined to function well in matching images of driver licenses, credit cards, business cards, and other similar documents.

For a test image, the DPI of an object to be detected or matched is generally not known. In order to account for this potential variation, it is useful to define a range that the actual image/video data resolution may reasonably fall within. In one embodiment, this may be accomplished substantially as follows. The range of resolution values may be quantized with a set of values, in some approaches. For instance, if the resolution range is in a search interval (a, b), where a and b are minimum and maximum DPI values respectively, then the interval (a, b) are divided into a set of sub intervals. The test image is scaled down to a set of images with different, but all reduced, resolutions, and each re-scaled image is matched to the training image. The best match found indicates the appropriate downscaling level.

The detail of a matching algorithm, according to one embodiment, is as follows. For each resolution in the search interval: a test image is scaled down to the resolution used in the reference image. A brute-force matching approach may be employed to identify the matching points between the reference image and test image. The key points in the reference image are matched against some, or preferably all, key points identified in the testing image. First, the best match for each key point both in the reference image and test image is identified by comparing the distance ratio of the two best candidate matches. When the distance ratio is larger than a predetermined threshold, the match is identified as an outlier.

After distance ratio testing, in some embodiments a symmetrical matching test may be applied to further identify other potential remaining outliers. In the symmetrical matching test, if the match between key points in the reference image and test image is unique (i.e. the key points in the reference and test image match one another, but do not match any other key points in the corresponding image), then the key points will be kept. If a match between corresponding key point(s) in the reference image and test image is not unique, those key points will be removed.

After performing brute-forced matching, there are still potential outliers in the remaining matches. Accordingly, an outlier identification algorithm such as a Random Sample Consensus (RANSAC) algorithm is applied to further remove outliers. The details of RANSAC algorithm are summarized below. In one embodiment implementing the RANSAC algorithm, the best match is found, and the number of matching key points is recorded.

RANSAC is a learning technique to estimate parameters of a model by random sampling of observed data. For plane image matching tasks, such as documents, the model is a homograph transformation of a 3 by 3 matrix.

In one embodiment, the RANSAC algorithm to estimate the homograph transformation is as follows. First, randomly select four key points in a testing image, and randomly select four key points in a reference image. Second, estimate a homograph transform with the above four key point pairs using a four-point algorithm, e.g. as described below regarding image reconstruction. Third, apply the homograph transformation to all key points in the reference and testing images. The inlier key points are identified if they match the model well, otherwise the key points will be identified as outliers. In various embodiments, more than four points may be selected for this purpose, but preferably four points are utilized to minimize computational overhead while enabling efficient, effective matching.

The foregoing three-step process is repeated in an iterative fashion to re-sample the key points and estimate a new homograph transform. In one embodiment, the number of iterations performed may be in a range from about $10^2$-$10^3$ iterations. After the iterative identification of key points is complete, the largest inlier set is retained, and an affine or homograph transform is re-estimated based on the retained inlier set.

After removing outliers, the matching process selects the reference image with the maximum number of matching points as the best match, and an affine or homograph transform is estimated with the best match to reconstruct the image and/or video data in a three-dimensional coordinate system. Image reconstruction mechanics are discussed in further detail below.

Figure 4A:
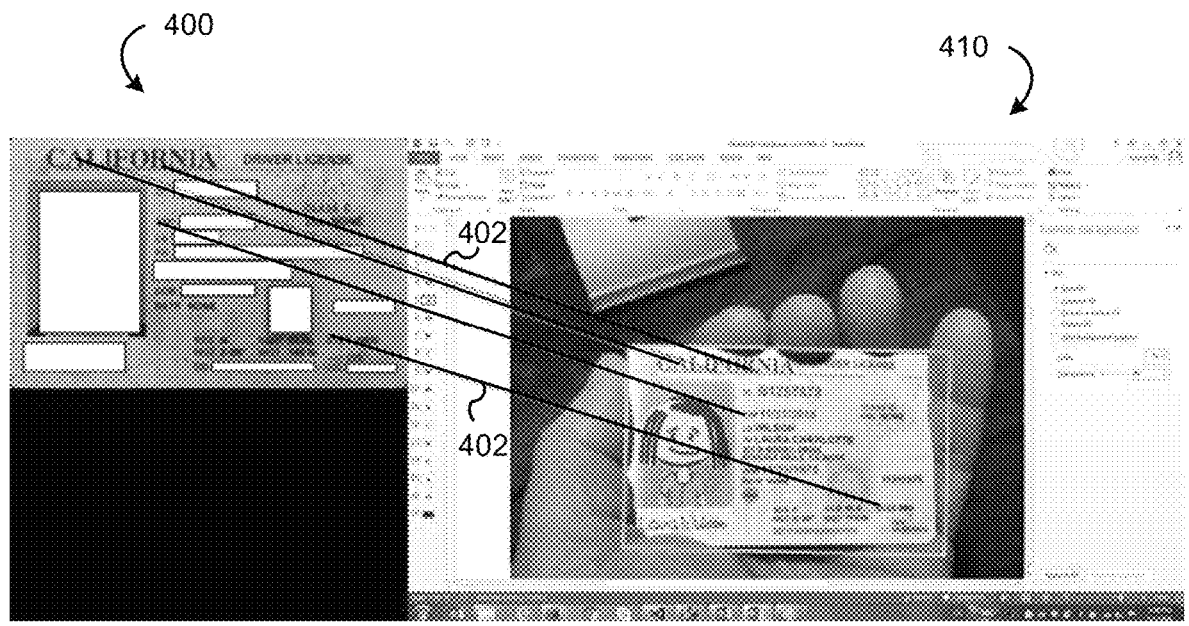
FIG. 4A depicts a mapping between matching distinctive features of a reference image and test image of a driver license, according to one embodiment.
Figure 4B:
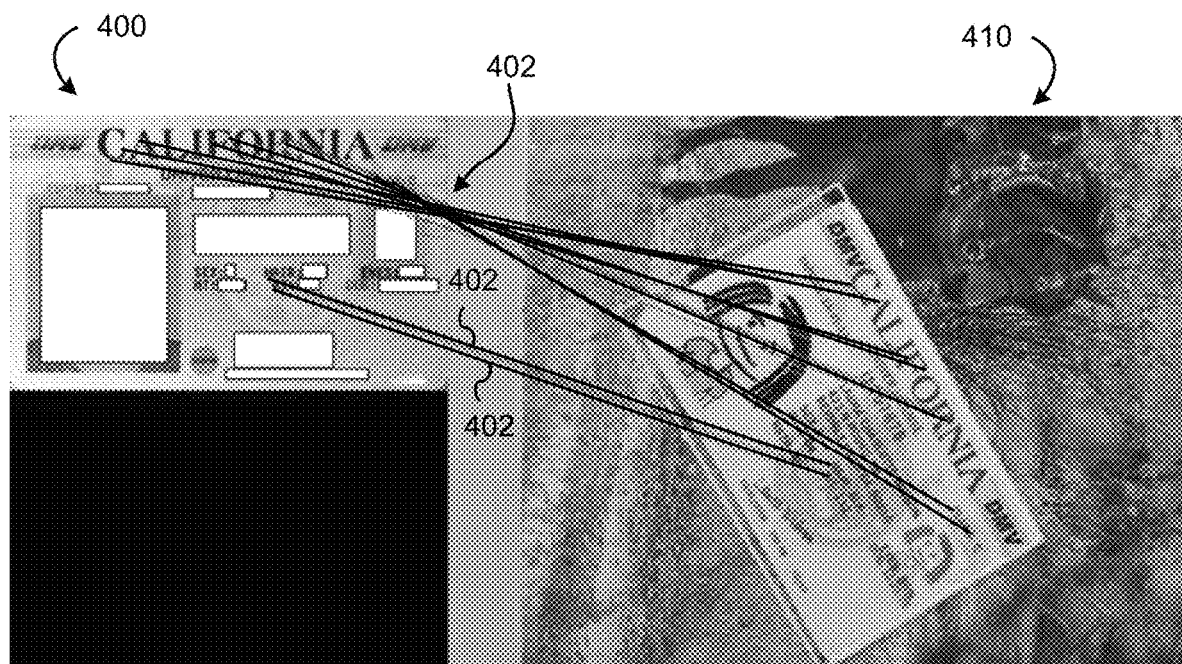
FIG. 4B depicts a mapping between matching distinctive features of a reference image and test image of a driver license, according to another embodiment where the test and reference images depict the driver license at different rotational orientations.
Figure 4C:
FIG. 4C depicts a mapping between matching distinctive features of a reference image and test image of a credit card, according to one embodiment.

Exemplary mappings of key points between a reference image 400 and test image 410 are shown, according to two embodiments, in FIGS. 4A-4B, with mapping lines 402 indicating the correspondence of key points between the two images. FIG. 4C depicts a similar reference/test image pair, showing a credit or debit card and exemplary corresponding key points therein, according to another embodiment.

Advantageously, by identifying internal key points and mapping key points located in a test image 410 to corresponding key points in a reference image 400, the presently disclosed inventive concepts can detect objects depicted in image and/or video data even when the edges of the object are obscured or missing from the image, or when a complex background is present in the image or video data.

Once an appropriate transform is estimated, the presently disclosed inventive concepts advantageously allow the estimation of object edge/border locations based on the transform. In brief, based on the edge locations determined from the reference image data, it is possible to estimate the locations of corresponding edges/borders in the test image via the transform, which defines the point-to-point correspondence between the object as oriented in the test image and a corresponding reference image orientation within the same coordinate system. According to the embodiment shown in FIGS. 4A and 4B, estimating the edge locations involves evaluating the transform of the document plane shown in test image 410 to the document plane shown in the reference image 400 (or vice versa), and extrapolating edge positions based on the transform.

FIG. 4C shows a similar mapping of key points between a reference image 400 and test image 410 of a credit card. In the particular case of credit cards, and especially credit cards including an IC chip, it is possible to identify key points within the region of the card including the IC chip, and estimate transform(s) and/or border locations using these regions as the sole source of key points, in various embodiments. Accordingly, the presently disclosed inventive concepts are broadly applicable to various different types of objects and identifying features, constrained only by the ability to obtain and identify appropriate identifying features in a suitable reference image or set of reference images. Those having ordinary skill in the art will appreciate the scope to which these inventive concepts may be applied upon reading the instant disclosures.

Based on the transform, and the projected object edges, the presently disclosed inventive concepts may include transforming and cropping the test image to form a cropped, reconstructed image based on the test image, the cropped, reconstructed image depicting the object according to a same perspective and cropping of the object as represented in the reference image perspective.

In addition, preferred embodiments may include functionality configured to refine the projected location of object edges. For example, considering the results depicted in FIGS. 4A-4C and 5, a skilled artisan will understand that the projected edges achieved in these exemplary embodiments are not as accurate as may be desired.

Figure 5:
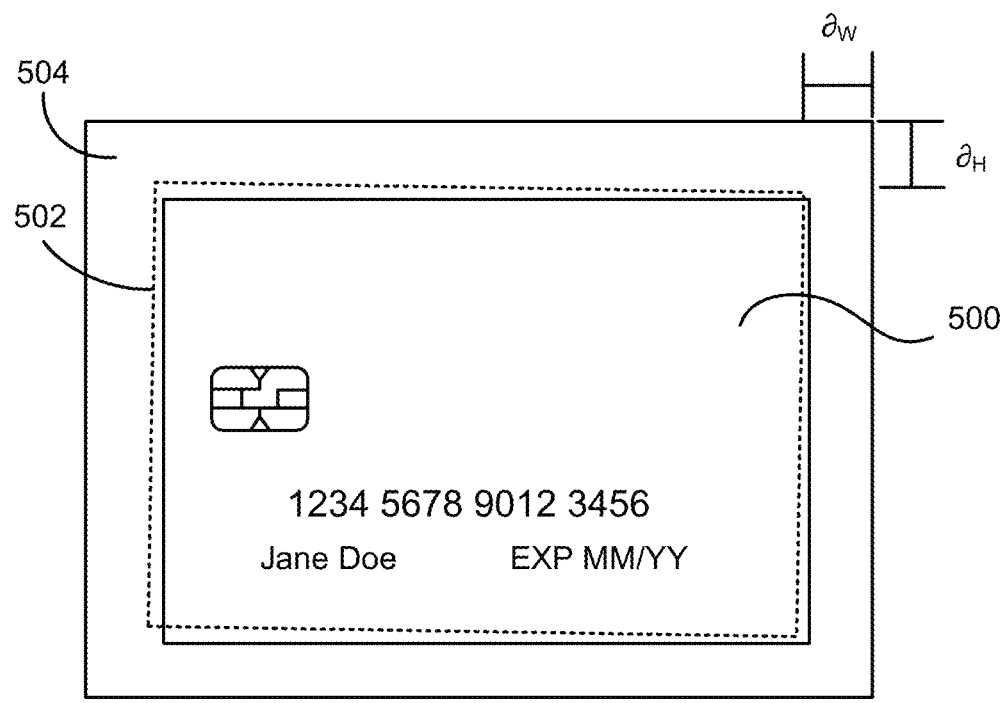
FIG. 5 is a simplified schematic of a credit card having edges thereof projected based on internal features of the credit card, according to one embodiment.

As shown in FIG. 5, an object 500 such as a credit card or other document is depicted in a test image, and edge locations 502 are projected based on the foregoing content-based approach. However, the projected edge locations 502 do not accurately correspond to the actual edges of the object 500. Accordingly, it may be advantageous, in some approaches, rather than cropping directly according to the projected edge locations 502, to crop in a manner so as to leave a predetermined amount of background texture depicted in the cropped image, and subsequently perform conventional edge detection. Conventional edge detection shall be understood to include any technique for detecting edges based on detecting transitions between an image background 504 and image foreground (e.g. object 500) as shown in FIG. 5. For example, in preferred approaches conventional edge detection may include any technique or functionality as described in U.S. Pat. No. 8,855,375 to Macciola, et al.

The predetermined amount may be represented by a threshold a, which may be a predefined number of pixels, a percentage of an expected aspect ratio, etc. in various embodiments. In some approaches, the amount may be different for each dimension of the image and/or object, e.g. for flat objects a predetermined height threshold $\partial_H$ and/or predetermined width threshold $\partial_W$ may be used. $\partial_H$ and $\partial_W$ may be determined experimentally, and need not be equal in various embodiments. For instance, $\partial_H$ and $\partial_W$ may independently be absolute thresholds or relative thresholds, and may be characterized by different values.

In this way, one obtains an image where the document is prominent in the view and the edges reside within some known margin. Now it is possible to employ normal or specialized edge detection techniques, which may include searching for the edge only within the margin. In "normal" techniques, the threshold for detection can be less stringent than typically employed when searching for edges using only a conventional approach, without content-based detection augmentation. For instance, in "normal" techniques the contrast difference required to identify an edge may be less than the difference required without content-based detection augmentation. In "specialized" techniques, one could allow for increased tolerance regarding existence of gaps in the edge than would normally be prudent when searching an entire image (e.g. as would be present in FIG. 4A).

In various approaches, a further validation may be performed on the image and/or video data by classifying the cropped, reconstructed image. Classification may be performed using any technique suitable in the art, preferably a classification technique as described in U.S. patent application Ser. No. 13/802,226 (filed Mar. 13, 2013). If the classification result returns the appropriate object type, then the image matching and transform operations are likely to have been correctly achieved, whereas if a different object type is returned from classification, then the transform and/or cropping result are likely erroneous. Accordingly, the presently disclosed inventive concepts may leverage classification as a confidence measure to evaluate the image matching and reconstruction techniques discussed herein.

As described herein, according to one embodiment a method 700 for detecting objects depicted in digital images based on internal features of the object includes operations as depicted in FIG. 7. As will be understood by a person having ordinary skill in the art upon reading the present descriptions, the method 700 may be performed in any suitable environment, including those depicted in FIGS. 1-2 and may operate on inputs and/or produce outputs as depicted in FIGS. 3A-5, in various approaches.

As shown in FIG. 7, method 700 includes operation 702, in which a plurality of identifying features of the object are detected. Notably, the identifying features are located internally with respect to the object, such that each identifying feature is, corresponds to, or represents a part of the object other than object edges, boundaries between the object and image background, or other equivalent transition between the object and image background. In this manner, and according to various embodiments the presently disclosed inventive content-based object recognition techniques are based exclusively on the content of the object, and/or are performed exclusive of traditional edge detection, border detection, or other similar conventional recognition techniques known in the art.

The method 700 also includes operation 704, where a location of one or more edges of the object are projected, the projection being based at least in part on the plurality of identifying features.

Of course, the method 700 may include any number of additional and/or alternative features as described herein in any suitable combination, permutation, selection thereof as would be appreciated by a skilled artisan as suitable for performing content-based object detection, upon reading the instant disclosures.

For instance, in one embodiment, method 700 may additionally or alternatively include detecting the plurality of identifying features based on analyzing a plurality of feature vectors each corresponding to pixels within a patch of the digital image. The analysis may be performed in order to determine whether the patch includes a sharp transition in intensity, in preferred approaches. The analysis may optionally involve determining a position of some or all of the plurality of identifying features, or position determination may be performed separately from feature vector analysis, in various embodiments.

Optionally, in one embodiment detecting the plurality of identifying features involves automatic feature zone discovery. The automatic feature zone discovery may be a multi-pass procedure.

Method 700 may also include identifying a plurality of distinctive pixels within the plurality of identifying features of the object. Distinctive pixels are preferably characterized by having or embodying distinct visual features of the object.

In a preferred approach, method 700 also includes matching the digital image depicting the object to one of a plurality of reference images each depicting a known object type. The reference images are more preferably images used to train the recognition/detection engine to identify specific identifying features that are particularly suitable for detecting and/or reconstructing objects of the known object type in various types of images and/or imaging circumstances (e.g. different angles, distances, resolutions, lighting conditions, color depths, etc. in various embodiments). Accordingly, the matching procedure may involve determining whether the object includes distinctive pixels that correspond to distinctive pixels present in one or more of the plurality of reference images.

The method 700 may also include designating as an outlier a candidate match between a distinctive pixel in the digital image and one or more candidate corresponding distinctive pixels present in one of the plurality of reference images. The outlier is preferably designated in response to determining a distance ratio is greater than a predetermined distance ratio threshold. Moreover, the distance ratio may be a ratio describing: a first distance between the distinctive pixel in the digital image and a first of the one or more candidate corresponding distinctive pixels; and a second distance between the distinctive pixel in the digital image and a second of the one or more candidate corresponding distinctive pixels.

In more embodiments, method 700 includes designating as an outlier a candidate match between a distinctive pixel in the digital image and a candidate corresponding distinctive pixel present in one of the plurality of reference images in response to determining the candidate match is not unique. Uniqueness may be determined according to a symmetrical matching test, in preferred approaches and as described in greater detail hereinabove.

Notably, employing reconstruction as set forth herein, particularly with respect to method 700, carries the advantage of being able to detect and recognize objects in images where at least one edge of the object is either obscured or missing from the digital image. Thus, the presently disclosed inventive concepts represent an improvement to image processing machines and the image processing field since conventional image detection and image processing/correction techniques are based on detecting the edges of objects and making appropriate corrections based on characteristics of the object and/or object edges (e.g. location within image, dimensions such as particularly aspect ratio, curvature, length, etc.). In image data where edges are missing, obscured, or otherwise not represented at least in part, such conventional techniques lack the requisite input information to perform the intended image processing/correction.

In some approaches, the method 700 may include cropping the digital image based at least in part on the projected location of the one or more edges of the object. The cropped digital image preferably depicts a portion of a background of the digital image surrounding the object; and in such approaches method 700 may include detecting one or more transitions between the background and the object within the cropped digital image.

The method 700 may optionally involve classifying the object depicted within the cropped digital image. As described in further detail elsewhere herein, classification may operate as a type of orthogonal validation procedure or confidence measure for determining whether image recognition and/or reconstruction was performed correctly by implementing the techniques described herein. In brief, if a reconstructed image of an object is classified and results in a determination that the object depicted in the reconstructed image is a same type of object represented in/by the reference image used to reconstruct the object, then it is likely the reconstruction was performed correctly, or at least optimally under the circumstances of the image data.

With continuing reference to classification, method 700 in one embodiment may include: attempting to detect the object within the digital image using a plurality of predetermined object detection models each corresponding to a known object type; and determining a classification of the object based on a result of attempting to detect the object within the digital image using the plurality of predetermined object detection models. The classification of the object is the known object type corresponding to one of the object detection models for which the attempt to detect the object within the digital image was successful.

The method 700, in additional aspects, may include: generating a plurality of scaled images based on the digital image, each scaled image being characterized by a different resolution; extracting one or more feature vectors from each scaled image; and matching one or more of the scaled images to one of a plurality of reference images. Each reference image depicts a known object type and being characterized by a known resolution.

In even further embodiments, method 700 may include extracting data from a detected object. Data extraction principles are described in greater detail below regarding methods 900-1100, as well as in U.S. patent application Ser. No. 14/209,825 (granted as U.S. Pat. No. 9,311,531), the contents of which are herein incorporated by reference.

Of course, in various embodiments and as described in greater detail below, the techniques and features of method 700 may be combined and used to advantage in any permutation with the various image reconstruction techniques and features such as presented with respect to method 800.

Content-Based Image Reconstruction

Reconstructing image and/or video data as described herein essentially includes transforming the representation of the detected object as depicted in the captured image and/or video data into a representation of the object as it would appear if viewed from an angle normal to a particular surface of the object. In the case of documents, or other flat objects, this includes reconstructing the object representation to reflect a face of the flat object as viewed from an angle normal to that face. For such flat objects, if the object is characterized by a known geometry (e.g. a particular polygon, circle, ellipsoid, etc.) then a priori knowledge regarding the geometric characteristics of the known geometry may be leveraged to facilitate reconstruction For other objects having three-dimensional geometries, and/or flat objects having non-standard geometries, reconstruction preferably includes transforming the object as represented in captured image and/or video data to represent a same or similar object type as represented in one or more reference images captured from a particular angle with respect to the object. Of course, reference images may also be employed to facilitate reconstruction of flat objects in various embodiments and without departing from the scope of the presently disclosed inventive concepts.

Accordingly, in preferred approaches the reconstructed representation substantially represents the actual dimensions, aspect ratio, etc. of the object captured in the digital image when viewed from a particular perspective (e.g. at an angle normal to the object, such as would be the capture angle if scanning a document in a traditional flatbed scanner, multifunction device, etc. as would be understood by one having ordinary skill in the art upon reading the present descriptions).

Various capture angles, and the associated projective effects are demonstrated schematically in FIGS. 6A-6D.

In some approaches, the reconstruction may include applying an algorithm such as a four-point algorithm to the image data.

In one embodiment, perspective correction may include constructing a 3D transformation based at least in part on the spatial distribution of features represented in the image and/or video data.

A planar homography/projective transform is a non-singular linear relation between two planes. In this case, the homography transform defines a linear mapping of four randomly selected pixels/positions between the captured image and the reference image.

The calculation of the camera parameters may utilize an estimation of the homography transform H, such as shown in Equation (1), in some approaches.

$$\lambda \begin{pmatrix} x \\ y \\ 1 \end{pmatrix} = \underbrace{\begin{pmatrix} h_{11} & h_{12} & h_{13} \\ h_{21} & h_{22} & h_{23} \\ h_{31} & h_{32} & h_{33} \end{pmatrix}}_{\text{homography } H} \begin{pmatrix} X \\ Y \\ 1 \end{pmatrix} \quad (1)$$

As depicted above in Equation (1):
  $\lambda$ is the focal depth of position (X, Y, Z) in the "reference" or "real-world" coordinate system, (e.g. a coordinate system derived from a reference image,). Put another way, $\lambda$ may be considered the linear distance between a point (X,Y,Z) in the reference coordinate system and the capture device;
  (x, y, z) are the coordinates of a given pixel position in the captured image; and
  H is a (3×3) matrix having elements $h_{i,j}$, where, i and j define the corresponding row and column index, respectively.

In one approach, the (x, y) coordinates and (X, Y) coordinates depicted in Equation 1 correspond to coordinates of respective points in the captured image plane and the reference image. In some approaches, the Z coordinate may be set to 0, corresponding to an assumption that the object depicted in each lies along a single (e.g. X-Y) plane with zero thickness. In one embodiment, it is possible to omit the z value in Equation 1 from the above calculations because it does not necessarily play any role in determining the homography matrix.

Thus, the homography H can be estimated by detecting four point-correspondences $p_i \leftrightarrow P_i'$ with $p_i = (x_i, y_i, 1)^T$ being the position of a randomly selected feature in the captured image plane; and $P_i' = (X_i, Y_i, 1)^T$ being the coordinates of the corresponding position in the reference image, where i is point index value with range from 1 to n in the following discussion. Using the previously introduced notation, Equation (1) may be written as shown in Equation (2) below.

$$\lambda p_i = HP_i' \quad (2)$$

In order to eliminate a scaling factor, in one embodiment it is possible to calculate the cross product of each term of Equation (2), as shown in Equation (3):

$$p_i \times (\lambda p_i) = p_i \times (HP_i') \quad (3)$$

Since $p_i \times p_i = 0_3$, Equation (3) may be written as shown below in Equation (4).

$$p_i \times HP_i' = 0_3 \quad (4)$$

Thus, the matrix product $HP_i'$ may be expressed as in Equation (5).

$$HP_i' = \begin{bmatrix} h^{1T} P_i' \\ h^{2T} P_i' \\ h^{3T} P_i' \end{bmatrix} \quad (5)$$

According to Equation 5, $h^{mT}$ is the transpose of the $m^{th}$ row of H (e.g. $h^{1T}$ is the transpose of the first row of H, $h^{2T}$ is the transpose of the second row of H, etc.). Accordingly, it is possible to rework Equation (4) as:

$$p_i \times HP_i' = \begin{pmatrix} x_i \\ y_i \\ 1 \end{pmatrix} \times \begin{bmatrix} h^{1T} P_i' \\ h^{2T} P_i' \\ h^{3T} P_i' \end{bmatrix} = \begin{bmatrix} y_i h^{3T} P_i' - h^{2T} P_i' \\ h^{1T} P_i' - x_i h^{3T} P_i' \\ x_i h^{2T} P_i' - y_i h^{1T} P_i' \end{bmatrix} = 0_3 \quad (6)$$

Notably, Equation (6) is linear in $h^{mT}$ and $h^{mT} P_i' = P_i'^T h^m$. Thus, Equation (6) may be reformulated as shown below in Equation (7):

$$\begin{bmatrix} 0_3^T & -P_i'^T & y_i P_i'^T \\ P_i'^T & 0_3^T & -x_i P_i'^T \\ -y_i P_i'^T & x_i P_i'^T & 0_3^T \end{bmatrix} \begin{bmatrix} h^1 \\ h^2 \\ h^3 \end{bmatrix} = 0_9 \quad (7)$$

Note that the rows of the matrix shown in Equation (7) are not linearly independent. For example, in one embodiment the third row is the sum of $-x_i$ times the first row and $-y_i$ times the second row. Thus, for each point-correspondence, Equation (7) provides two linearly independent equations. The two first rows are preferably used for solving H.

Because the homography transform is written using homogeneous coordinates, in one embodiment the homography H may be defined using 8 parameters plus a homogeneous scaling factor (which may be viewed as a free $9^{th}$ parameter). In such embodiments, at least 4 point-correspondences providing 8 equations may be used to compute the homography. In practice, and according to one exemplary embodiment, a larger number of correspondences is preferably employed so that an over-determined linear system is obtained, resulting in a more robust result (e.g. lower error in relative pixel-position). By rewriting H in a vector form as $h = [h_{11}, h_{12}, h_{13}, h_{21}, h_{22}, h_{23}, h_{31}, h_{32}, h_{33}]^T$, n pairs of point-correspondences enable the construction of a 2n×9 linear system, which is expressed by Equation (8)

$$\begin{pmatrix} 0 & 0 & 0 & -X_1 & -Y_1 & -1 & y_1X_1 & y_1X_1 & y_1 \\ X_1 & Y_1 & 1 & 0 & 0 & 0 & -x_1X_1 & -x_1Y_1 & -x_1 \\ 0 & 0 & 0 & -X_2 & -Y_2 & -1 & y_2X_2 & y_2X_2 & y_2 \\ X_2 & Y_2 & 1 & 0 & 0 & 0 & -x_2X_2 & -x_2Y_2 & -x_2 \\ \vdots & \vdots & \vdots & \vdots & \vdots & \vdots & \vdots & \vdots & \vdots \\ 0 & 0 & 0 & -X_n & -Y_n & -1 & y_nX_n & y_nX_n & y_n \\ X_n & Y_n & 1 & 0 & 0 & 0 & -x_nX_n & -x_nY_n & -x_n \end{pmatrix}_{C} \begin{pmatrix} h_{11} \\ h_{12} \\ h_{13} \\ h_{21} \\ h_{22} \\ h_{23} \\ h_{31} \\ h_{32} \\ h_{33} \end{pmatrix} \quad (8)$$

As shown in Equation 8, the first two rows correspond to the first feature point, as indicated by the subscript value of coordinates X, Y, x, y—in this case the subscript value is 1. The second two rows correspond to the second feature point, as indicated by the subscript value 2, the last two rows correspond to the $n^{th}$ feature point. For a four-point algorithm, n is 4, and the feature points are the four randomly selected features identified within the captured image and corresponding point of the reference image.

In one approach, solving this linear system involves the calculation of a Singular Value Decomposition (SVD). Such an SVD corresponds to reworking the matrix to the form of the matrix product $C=UDV^T$, where the solution h corresponds to the eigenvector of the smallest eigenvalue of matrix C, which in one embodiment may be located at the last column of the matrix V when the eigenvalues are sorted in descendant order.

It is worth noting that the matrix C is different from the typical matrix utilized in an eight-point algorithm to estimate the essential matrix when two or more cameras are used, such as conventionally performed for stereoscopic machine vision. More specifically, while the elements conventionally used in eight-point algorithm consist of feature points projected on two camera planes, the elements in the presently described matrix C consist of feature points projected on only a single camera plane and the corresponding feature points on 3D objects.

In one embodiment, to avoid numerical instabilities, the coordinates of point-correspondences may preferably be normalized. This may be accomplished, for example, using a technique known as the normalized Direct Linear Transformation (DLT) algorithm. For example, in one embodiment, after the homography matrix is estimated, Equation 1 may be used to compute each pixel position (x, y) for a given value of (X, Y). In practical applications the challenge involves computing (X, Y) when the values of (x, y) are given or known a priori. As shown in Equation 1, and in preferred embodiments, (x, y) and (X, Y) are symmetrical (i.e. when the values of (x, y) and (X, Y) are switched, the validity of Equation 1 holds true). In this case, the "inverse" homography matrix may be estimated, and this "inverse" homography matrix may be used to reconstruct 3D (i.e. "reference" or "real-world") coordinates of an object given the corresponding 2D coordinates of the object as depicted in the captured image, e.g. in the camera view.

Based on the foregoing, it is possible to implement the presently described four-point algorithm (as well as any equivalent variation and/or modification thereof that would be appreciated by a skilled artisan upon reading these descriptions) which may be utilized in various embodiments to efficiently and effectively reconstruct digital images characterized by at least some perspective distortion into corrected digital images exempting any such perspective distortion, where the corrected image is characterized by a pixel location error of about 5 pixels or less.

Various embodiments may additionally and/or alternatively include utilizing the foregoing data, calculations, results, and/or concepts to derive further useful information regarding the captured image, object, etc. For example, in various embodiments it is possible to determine the distance between the captured object and the capture device, the pitch and/or roll angle of the capture device, etc. as would be understood by one having ordinary skill in the art upon reading the present descriptions.

After (X, Y) values are estimated, the expression in Equation 1 may be described as follows:

$$\lambda = h_{31}X + h_{32}Y + h_{33} \quad (9)$$

Accordingly, in one embodiment the focal depth, also known as the distance between each point (X, Y, Z) in the 3D (i.e. "reference" or "real world") coordinate system and the capture device, may be computed using Equation 9 above.

Determining a Rotation Matrix of the Object.

After estimating the position of the 3D object (X, Y) and λ for each pixel in the captured image. Note that (X, Y) are the coordinates in the world coordinate system, while λ is the distance to the point (X, Y) in the camera coordinate system. If the 3D object is assumed to be a rigid body, it is appropriate to use the algorithm disclosed herein to estimate the rotation matrix from the world coordinate system to the camera coordinate system. The following equation holds for rotation and translation of the point (X, Y, 0):

$$\begin{pmatrix} X_c \\ Y_c \\ Z_c \end{pmatrix} = R \begin{pmatrix} X \\ Y \\ 0 \end{pmatrix} + t \quad (10)$$

where (Xc, Yc, Zc) are the coordinates relative to camera coordinate system, which are derived by rotating a point (X, Y, Z) in the world coordinate system with rotation matrix R, and a translation vector of t, where t is a constant independent of (X, Y). Note that the value of Zc is the same as the value of k, as previously estimated using equation 9.

Considering the relationships of homography matrix H and intrinsic camera parameter matrix A and r1, r2, where r1, r2 are the first and second column vectors respectively, reveals the following relationship:

$$H = \sigma A(r_1, r_2, t) \quad (11)$$

where σ is a constant and A is the intrinsic camera parameter matrix, defined as:

$$A = \begin{pmatrix} a & c & d \\  & b & e \\  &  & 1 \end{pmatrix} \quad (12)$$

where a and b are scaling factors which comprise of the camera focal length information, a=f/dx, and b=f/dy, where f is the focal length, while dx, dy are scaling factors of the image; c is the skew parameter about two image axes, and (d, e) are the coordinates of the corresponding principal point.

After estimation of homography matrix H, the matrix A can be estimated as follows:

$$a = \sqrt{w/B_{11}}; \quad (12.1)$$

$$b = \sqrt{wB_{11}(B_{11}B_{22} - B_{12}^2)}; \quad (12.2)$$

-continued $$c = -B_{12}a^2b/w; d = \frac{vv_o}{b} - B_{13}a^2/w; \quad (12.3)$$

$$v = -B_{12}a^2b/w; \quad (12.4)$$

$$e = (B_{12}B_{13} - B_{11}b_{23})/(B_{11}B_{22} - B_{12}^2); \quad (12.5)$$

$$w = B_{33} - (B_{13}^2 + e(B_{12}B_{13} - B_{11}b_{23}))/B_{11}. \quad (12.6)$$

In the above relationships, the unknown parameters are $B_{ij}$. These values are estimated by the following equations:

$$\begin{pmatrix} v_{12}^t \\ (v_{11} - v_{22})^t \end{pmatrix} G = 0, \quad (12.7)$$

where G is the solution of the above equation, alternatively expressed as:

$$G = (B_{11}, B_{12}, B_{22}, B_{13}, B_{23}, B_{33})^t, \quad (12.8)$$

where $v_{ij} = (h_{i1}h_{j1}, h_{i1}h_{j2} + h_{i2}h_{j1}, h_{i2}h_{j2}, h_{i3}h_{j1} + h_{i1}h_{j3},$
$h_{i3}h_{j2} + h_{i2}h_{j3}, h_{i3}h_{j3})^t \quad (12.9)$ Note that in a conventional four-points algorithm, since it is possible to accurately estimate scaling factors a, b, the skew factor c is assumed to be zero, which means that one may ignore camera's skew distortion. It is further useful, in one embodiment, to assume that d and e have zero values (d=0, e=0).

From equation (11), B=(r1 r2 t), where $\sigma^{-1} A^{-3} H = B$. Utilizing this relationship enables a new approach to estimate r1, r2 from the equation C=(r1 r2 0) where the first and second column vectors of C are the first and second column vectors of B, and the third column vector of C is 0.

First, decompose matrix C with SVD (Singular Value Decomposition) method, $C = U\Sigma V^t$, where U is 3 by 3 orthogonal matrix, where V is 3 by 3 orthogonal matrix. Then r1 and r2 are estimated by the following equation:

$$(r_1 \ r_2 \ 0) = U \begin{pmatrix} W \\ 0 \end{pmatrix} \quad (13)$$

where W is a 2 by 3 matrix whose first and second row vectors are the first and second row vectors of $V^t$ respectively. In the above computation, assume $\sigma$ is 1. This scaling factor does not influence the value of U and W and therefore does not influence the estimation of r1 and r2. After r1, r2 are estimated (e.g. using Equation 13), it is useful to leverage the fact that R is a rotation matrix to estimate r3, which is the cross product of r1 and r2 with a sign to be determined (either 1 or −1). There are two possible solutions of R. In one example using a right-hand coordinate system, the r3 value is the cross-product value of r1 and r2.

Determining Yaw, Pitch, and Roll from a Rotation Matrix.

The yaw, pitch and roll (denoted by the $\alpha$, $\beta$ and $\gamma$ respectively) are also known as Euler's angles, which are defined as the rotation angles around z, y, and x axes respectively, in one embodiment. According to this approach, the rotation matrix R in Equation 10 can be denoted as:

$$R = \begin{pmatrix} r_{11} & r_{12} & r_{13} \\ r_{21} & r_{22} & r_{23} \\ r_{31} & r_{32} & r_{33} \end{pmatrix} \quad (14)$$

where each r is an element of the matrix R.

It is often convenient to determine the $\alpha$, $\beta$ and $\gamma$ parameters directly from a given rotation matrix R. The roll, in one embodiment, may be estimated by the following equation (e.g. when $r_{33}$ is not equal to zero):

$$\gamma = \text{atan } 2(r_{32}, r_{33}) \quad (15)$$

Similarly, in another approach the pitch may be estimated by the following equation:

$$\beta = \text{atan} 2(-r_{31}, \sqrt{r_{11}^2 + r_{21}^2}) \quad (16)$$

In still more approaches, the yaw may be estimated by the following equation (e.g. when $r_{11}$ is nonzero)

$$\alpha = \text{atan} 2(r_{21}, r_{11}) \quad (17)$$

Notably, in some approaches when $r_{11}$, $r_{33}$ or $\sqrt{r_{11}^2 + r_{21}^2}$ are near in value to zero (e.g. $0 < r_{11} < \varepsilon$, $0 < r_{33} < \varepsilon$, or $0 < \sqrt{r_{11}^2 + r_{21}^2} < \varepsilon$, where the value c is set to a reasonable value for considering the numerical stability, such as $0 < \varepsilon \leq 0.01$, in one embodiment, and $\varepsilon = 0.0001$ in a particularly preferred embodiment. In general, the value of $\varepsilon$ may be determined in whole or in part based on limited computer word length, etc. as would be understood by one having ordinary skill in the art upon reading the present descriptions), this corresponds to the degenerate of rotation matrix R, special formulae are used to estimate the values of yaw, pitch and roll.

Estimating Distance Between Object and Capture Device

In still more embodiments, it is possible to estimate the distance between an object and a capture device even without the knowledge of the object size, using information such as a camera's intrinsic parameters (e.g. focal length, scale factors of (u, v) in image plane).

The requirements of this algorithm, in one approach, may be summarized as follows: 1) The camera's focal length for the captured image can be provided and accessed by an API call of the device (for instance, an android device provides an API call to get focal length information for the captured image); 2) The scale factors of dx and dy are estimated by the algorithm in the equations 12.1 and 12.2.

This enables estimation of the scale factors dx, dy for a particular type of device, and does not require estimating scale factors for each device individually. For instance, in one exemplary embodiment utilizing an Apple iPhone® 4 smartphone, it is possible, using the algorithm presented above, to estimate the scale factors using an object with a known size. The two scaling factors may thereafter be assumed to be identical for the same device type.

The algorithm to estimate object distance to camera, according to one illustrative approach, is described as follows: normalize (u, v), (X, Y) in the equation below $$\lambda \begin{pmatrix} u \\ v \\ 1 \end{pmatrix} = H \begin{pmatrix} X \\ Y \\ 1 \end{pmatrix} \quad (18)$$

Note that Equation 18 is equivalent to Equation 1, except (u, v) in Equation 18 replaces the (x, y) term in Equation 1.

Suppose that $\tilde{u} = u/L_u$, $\tilde{v} = v/L_v$; $\tilde{x} = X/L_x$; $\tilde{y} = Y/L_y$; where $L_u$, $L_v$ are image size in coordinates u and v and $L_x$, $L_y$ are the object size to be determined. Then Equation 18 may be expressed as:

$$\lambda \begin{pmatrix} \tilde{u} \\ \tilde{v} \\ 1 \end{pmatrix} = \tilde{H} \begin{pmatrix} \tilde{x} \\ \tilde{y} \\ 1 \end{pmatrix}, \quad (19)$$

where $$\tilde{H} = \begin{pmatrix} 1/L_u & & \\ & 1/L_v & \\ & & 1 \end{pmatrix} H \begin{pmatrix} L_x & & \\ & L_y & \\ & & 1 \end{pmatrix} \quad (20)$$

Normalized homography matrix $\tilde{H}$ can be estimated by equation (20). Note that from equation 11, the following may be determined:

$$H = \sigma A(r_1 r_2 t) \quad (21)$$

and the intrinsic parameter matrix of the camera is assumed with the following simple form:

$$A = \begin{pmatrix} f/dx & c & d \\ & f/dy & e \\ & & 1 \end{pmatrix} \quad (22)$$

where f is the camera focal length, dx, dy are scaling factors of the camera, which are estimated.

From equations (19), (20) and (21), thus:

$$\sigma A(r_1 \ r_2 \ t) \begin{pmatrix} L_x & & \\ & L_y & \\ & & 1 \end{pmatrix} = \tilde{\tilde{H}} \quad (23)$$

where $\tilde{\tilde{H}} = \begin{pmatrix} L_u & & \\ & L_v & \\ & & 1 \end{pmatrix} \tilde{H}$ Because A is known, from equation (23) the following may be determined:

$$\sigma(r_1 \ r_2 \ t) \begin{pmatrix} L_x & & \\ & L_y & \\ & & 1 \end{pmatrix} = A^{-1} \tilde{\tilde{H}} \quad (24)$$

Denote $K = A^{-1} \tilde{\tilde{H}}$, $K = (k_1, k_2, k_3)$, from equation (24) the following may be determined:

$$\sigma r_1 L_x = k_1 \quad (25)$$

$$\sigma r_2 L_y = k_2 \quad (26)$$

$$\sigma t = k_3 \quad (27)$$

because t in equation (27) is the translation vector of the object relative to camera. The L2 norm (Euclidean norm) of t is as follows:

$$\|t\| = \|k_3\|/\sigma \quad (28)$$

is the distance of left-top corner of the object to the camera.

Because $\|r_1\| = \|r_2\| = 1$, from equation (8) and (9), the following may be determined $$L_x = \|k_1\|/\sigma \quad (29)$$

$$L_y = \|k_2\|/\sigma \quad (30)$$

Equations (29) and (30) may be used to estimate the document size along X and Y coordinates. The scaling factor may remain unknown, using this approach.

Note that the algorithm to estimate rotation matrix described above does not need the scaling factor σ. Rather, in some approaches it is suitable to assume σ=1. In such cases, it is possible to estimate roll, pitch, and yaw with the algorithm presented above. Equations (29) and (30) may also be used to estimate the aspect ratio of the object as:

$$\text{aspectratb} = L_x/L_y = \|k_1\|/\|k_2\| \quad (31)$$

Estimation of Pitch and Roll from Assumed Rectangle.

In practice the most common case is the camera capture of rectangular documents, such as sheets of paper of standard sizes, business cards, driver and other licenses, etc. Since the focal distance of the camera does not change, and since the knowledge of the yaw is irrelevant for the discussed types of document image processing, it is necessary only to determine roll and pitch of the camera relative to the plane of the document in order to rectangularize the corresponding image of the document.

The idea of the algorithm is simply that one can calculate the object coordinates of the document corresponding to the tetragon found in the picture (up to scale, rotation, and shift) for any relative pitch-roll combination. This calculated tetragon in object coordinates is characterized by 90-degree angles when the correct values of pitch and roll are used, and the deviation can be characterized by the sum of squares of the four angle differences. This criterion is useful because it is smooth and effectively penalizes individual large deviations.

A gradient descent procedure based on this criterion can find a good pitch-roll pair in a matter of milliseconds. This has been experimentally verified for instances where the tetragon in the picture was correctly determined. This approach uses yaw equal zero and an arbitrary fixed value of the distance to the object because changes in these values only add an additional orthogonal transform of the object coordinates. The approach also uses the known focal distance of the camera in the calculations of the coordinate transform, but if all four corners have been found and there are three independent angles, then the same criterion and a slightly more complex gradient descent procedure can be used to estimate the focal distance in addition to pitch and roll—this may be useful for server-based processing, when incoming pictures may or may not have any information about what camera they were taken with.

Interestingly, when the page detection is wrong, even the optimal pitch-roll pair leaves sizeable residual angle errors (of 1 degree or more), or, at least, if the page was just cropped-in parallel to itself, the aspect ratio derived from the found object coordinates does not match the real one.

Additionally, it is possible to apply this algorithm even when a location of one of the detected sides of the document is suspect or missing entirely (e.g. that side of the document is partially or completely obstructed, not depicted, or is blurred beyond recognition, etc.). In order to accomplish the desired result it is useful to modify the above defined criterion to use only two angles, for example those adjacent to the bottom side, in a gradient descent procedure. In this manner, the algorithm may still be utilized to estimate pitch and roll from a picture tetragon with bogus and/or undetectable top-left and top-right corners.

In one example, arbitrary points on the left and right sides closer to the top of the image frame can be designated as top-left and top-right corners. The best estimated pitch-roll will create equally bogus top-left and top-right corners in the object coordinates, but the document will still be correctly rectangularized. The direction of a missing (e.g. top) side of the document can be reconstructed since it should be substantially parallel to the opposite (e.g. bottom) side, and orthogonal to adjacent (e.g. left and/or right) side(s).

The remaining question is where to place the missing side in the context of the image as a whole, and if the aspect ratio is known then the offset of the missing side can be nicely estimated, and if not, then it can be pushed to the edge of the frame, just not to lose any data. This variation of the algorithm can resolve an important user case when the picture contains only a part of the document along one of its sides, for example, the bottom of an invoice containing a deposit slip. In a situation like this the bottom, left and right sides of the document can be correctly determined and used to estimate pitch and roll; these angles together with the focal distance can be used to rectangularize the visible part of the document.

In more approaches, the foregoing techniques for addressing missing, obscured, etc. edges in the image data may additionally and/or alternatively employ a relaxed cropping and subsequent use of conventional edge detection as described above with reference to FIG. 5. Of course, if the edge is completely missing from the image and/or video data, then the relaxed cropping techniques may not be suitable to locate the edges and projection as described above may be the sole suitable mechanism for estimating the location of edges. However, in the context of the present disclosures, using internally represented content rather than corner or edge positions as key points allows projection of edge locations in a broader range of applications, and in a more robust manner than conventional edge detection.

As described herein, according to one embodiment a method 800 for reconstructing objects depicted in digital images based on internal features of the object includes operations as depicted in FIG. 8. As will be understood by a person having ordinary skill in the art upon reading the present descriptions, the method 800 may be performed in any suitable environment, including those depicted in FIGS. 1-2 and may operate on inputs and/or produce outputs as depicted in FIGS. 3A-5, in various approaches.

As shown in FIG. 8, method 800 includes operation 802, in which a plurality of identifying features of the object are detected. Notably, the identifying features are located internally with respect to the object, such that each identifying feature is, corresponds to, or represents a part of the object other than object edges, boundaries between the object and image background, or other equivalent transition between the object and image background. In this manner, and according to various embodiments the presently disclosed inventive image reconstruction techniques are based exclusively on the content of the object, and/or are performed exclusive of traditional edge detection, border detection, or other similar conventional recognition techniques known in the art.

The method 800 also includes operation 804, where the digital image of the object is reconstructed within a three dimensional coordinate space based at least in part on some or all of the plurality of identifying features. In various embodiments, the portion of the image depicting the object may be reconstructed, or the entire image may be reconstructed, based on identifying feature(s)

Of course, the method 800 may include any number of additional and/or alternative features as described herein in any suitable combination, permutation, selection thereof as would be appreciated by a skilled artisan as suitable for performing content-based object detection, upon reading the instant disclosures.

For instance, in one embodiment, method 800 may additionally or alternatively include reconstructing the digital image of the object based on transforming the object to represent dimensions of the object as viewed from an angle normal to the object. As such, reconstruction effectively corrects perspective distortions, skew, warping or "fishbowl" effects, and other artifacts common to images captured using cameras and mobile devices.

Optionally, in one embodiment reconstructing the digital image of the object is based on four of the plurality of identifying features, and employs a four-point algorithm as described in further detail elsewhere herein. In such embodiments, preferably the four of the plurality of identifying features are randomly selected from among the plurality of identifying features. In some approaches, and as described in greater detail below, reconstruction may involve an iterative process whereby multiple sets of four or more randomly selected identifying features are used to, e.g. iteratively, estimate transform parameters and reconstruct the digital image. Accordingly, reconstructing the digital image of the object may be based at least in part on applying a four-point algorithm to at least some of the plurality of identifying features of the object, in certain aspects.

Reconstructing the digital image of the object may additionally and/or alternatively involve estimating a homography transform H. In one approach, estimating H comprises detecting one or more point correspondences $p_i \leftrightarrow P_i'$ with $p_i=(x_i, y_i, 1)^T$ as discussed above. Optionally, but preferably, each point correspondence $p_i \leftrightarrow P_i'$ corresponds to a position $p_i$ of one of the plurality of identifying features of the object, and a respective position $P_i'$ of a corresponding identifying feature of the reconstructed digital image of the object. Estimating H may also include normalizing coordinates of some or all of the point correspondences.

As noted above, estimating the homography transform H may include an iterative process. In such embodiments, each iteration of the iterative process preferably includes: randomly selecting four key points; using a four point algorithm to estimate an $i^{th}$ homography transform $H_i$ based on the four key points; and applying the estimated $i^{th}$ homography transform $H_i$ to a set of corresponding key points. Each key point corresponds to one of the plurality of identifying features of the object, and in some embodiments may be one of the plurality of identifying features of the object. The set of corresponding key points preferably is in the form of a plurality of point correspondences, each point correspondence including: a key point other than the four randomly selected key points; and a corresponding key point from a reference image corresponding to the digital image. The "other" key points also correspond to one of the plurality of identifying features of the object. Thus, each point correspondence includes two key points in preferred embodiments: a key point from the test image and a corresponding key point from the reference image. The degree of correspondence between point correspondences may reflect the fitness of the homography transform, in some approaches.

Thus, in some approaches method 800 may include evaluating fitness of the homography transform (or multiple homography transforms generated in multiple iterations of the aforementioned process). The evaluation may include determining one or more outlier key points from among each set of corresponding key points; identifying, from among all sets of corresponding key points, the set of corresponding key points having a lowest number of outlier key points; defining a set of inlier key points from among the set of corresponding key points having the lowest number of outlier key points; and estimating the homography transform H based on the set of inlier key points. Preferably, the set of inlier key points exclude the outlier key points determined for the respective set of corresponding key points.

Furthermore, determining the one or more outlier key points from among each set of corresponding key points may involve: determining whether each of the plurality of point correspondences fits a transformation model corresponding to the estimated $i^{th}$ homography transform $H_i$; and, for each of the plurality of point correspondences, either: designating the other key point of the point correspondence as an outlier key point in response to determining the point correspondence does not fit the transformation model; or designating the other key point of the point correspondence as an inlier key point in response to determining the point correspondence does fit the transformation model.

In several approaches, particularly preferred in the case of objects such as documents and especially standard documents such as forms, templates, identification documents, financial documents, medical documents, insurance documents, etc. as would be understood by a skilled artisan upon reading the instant descriptions, the plurality of identifying features correspond to boilerplate content of the object. In various approaches, boilerplate content may include any type of such content as described hereinabove.

Notably, employing reconstruction as set forth herein, particularly with respect to method 800, carries the advantage of being able to reconstruct objects and/or images where at least one edge of the object is either obscured or missing from the digital image. Thus, the presently disclosed inventive concepts represent an improvement to image processing machines and the image processing field since conventional image recognition and image processing/correction techniques are based on detecting the edges of objects and making appropriate corrections based on characteristics of the object and/or object edges (e.g. location within image, dimensions such as particularly aspect ratio, curvature, length, etc.). In image data where edges are missing, obscured, or otherwise not represented at least in part, such conventional techniques lack the requisite input information to perform the intended image processing/correction. It should be understood that similar advantages are conveyed in the context of image recognition and method 700, which enables recognition of objects even where all edges of the object may be missing or obscured in the digital image data since recognition is based on features internal to the object.

In more embodiments, method 800 may include cropping the reconstructed digital image of the object based at least in part on a projected location of one or more edges of the object within the reconstructed digital image. The projected location of the one or more edges of the object is preferably based at least in part on an estimated homography transform H.

In still more embodiments, method 800 may include classifying the reconstructed digital image of the object. As described in further detail in U.S. patent application Ser. No. 13/802,226 (granted as U.S. Pat. No. 9,355,312), the contents of which are herein incorporated by reference, classification may operate as a type of orthogonal validation procedure or confidence measure for determining whether image recognition and/or reconstruction was performed correctly by implementing the techniques described herein. In brief, if a reconstructed image of an object is classified and results in a determination that the object depicted in the reconstructed image is a same type of object represented in/by the reference image used to reconstruct the object, then it is likely the reconstruction was performed correctly, or at least optimally under the circumstances of the image data.

In even further embodiments, method 800 may include extracting data from a reconstructed digital image of the object. Data extraction principles are described in greater detail below regarding methods 900-1100, as well as in U.S. patent application Ser. No. 14/209,825 (granted as U.S. Pat. No. 9,311,531), the contents of which are herein incorporated by reference.

Data Extraction

In addition to performing improved image processing based on content, e.g. content-based detection and/or reconstruction of objects within image data, a user may wish to gather information about one or more objects, and/or content therein, depicted in a digital image. In several embodiments, it is advantageous to leverage object classification for the purposes of extracting data from digital images. As described in further detail below, the presently disclosed methods, systems and computer program products thus include functionality for extracting data from digital images based on object classification.

The data extraction embodiments discussed herein may utilize one or more of the functionalities disclosed in related U.S. patent application Ser. No. 12/042,994, filed Mar. 5, 2008; and Ser. No. 12/368,685, filed Feb. 10, 2009, and U.S. Pat. No. 9,961,391, granted Jul. 20, 2010 (U.S. patent application Ser. No. 11/952,364, filed May 13, 2009 each of which is herein incorporated by reference in its entirety. For example, the presently disclosed embodiments of data extraction may utilize one or more of support-vector-machine (SVM) techniques, learn-by-example (LBE) techniques, feature vectors, feature matrices, document validation techniques, dataset organization techniques, transductive classification techniques, maximum entropy discrimination (MED) techniques, etc. as disclosed therein.

Figure 9:
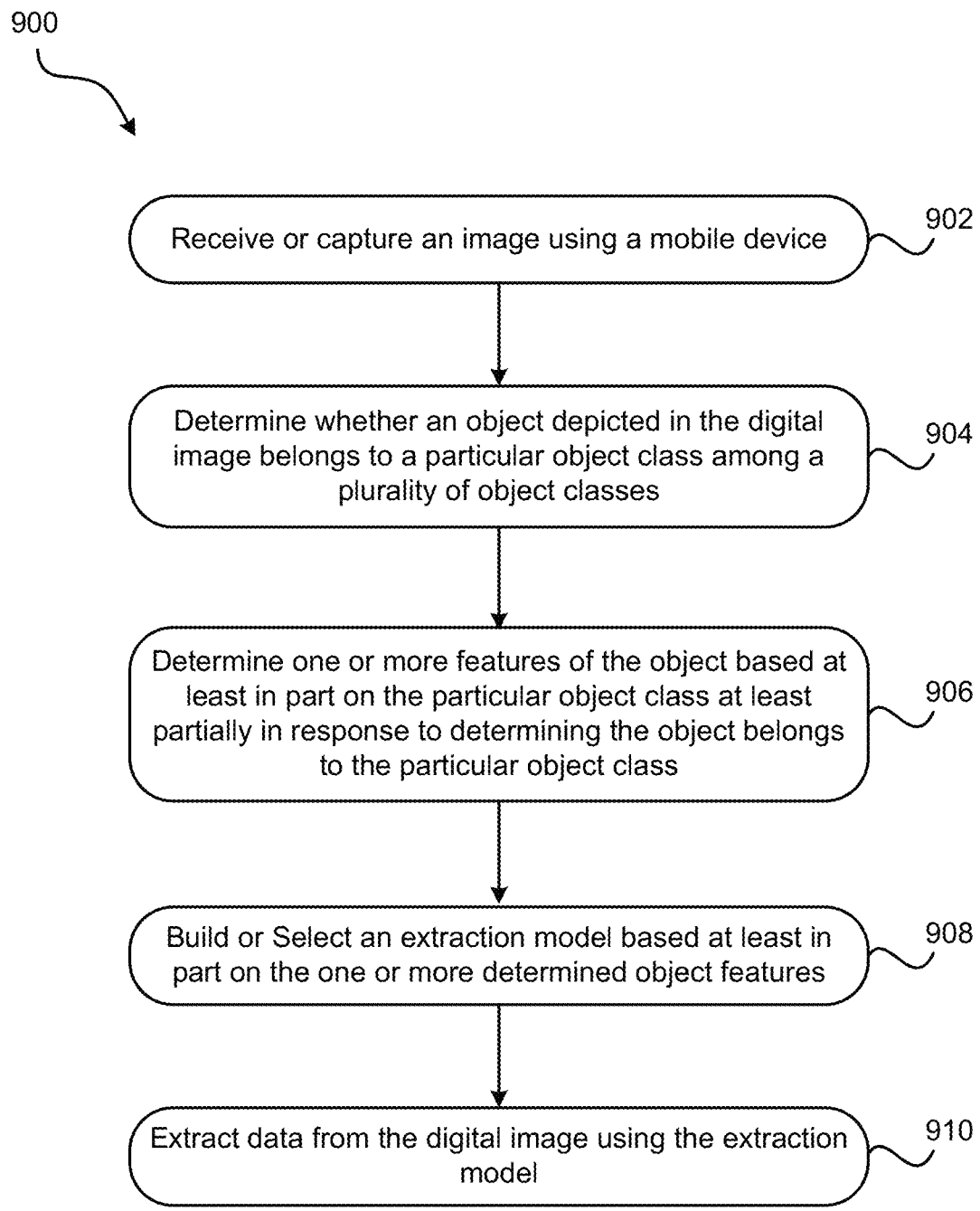
FIG. 9 is a flowchart of a method for extracting data from objects depicted in digital images, according to one embodiment.

Referring now to FIG. 9, a method 900 is shown, according to one embodiment. The method may be performed in any suitable environment and/or utilizing any suitable mechanism(s), including those depicted in FIGS. 1-4D, in various approaches.

In one approach, method 900 includes operation 902, where a digital image captured by a mobile device is received. The digital image may be received and/or stored in a memory of the mobile device used to capture the image, another mobile device, and/or a remote computer such as a server and/or cloud storage environment, in various embodiments. Moreover, the digital image may be received from a variety of sources, such as a component of the mobile device including a camera, a memory, wireless receiver, antenna, etc. as would be understood by one having ordinary skill in the art upon reading the present descriptions. In other approaches, the digital image may be received from a remote device, such as a remote server, another mobile device, a camera with integrated data transmission capability, a facsimile machine or other multifunction printer, etc. The digital image may optionally be received via an online service, a database, etc. as would be understood by the skilled artisan reading this disclosure.

Method 900 further includes performing operations 904-910, preferably using a processor of one or more mobile devices, but potentially also or instead using a processor of one or more servers, or combinations of mobile device and server processors . . . As will be understood by one having ordinary skill in the art upon reading the present descriptions, various embodiments of method 900 may involve performing any of operations 902-910 using processor(s) of one or more mobile devices, processor(s) of one or more servers, processing resources of a cloud computing environment, etc. as well as any combination thereof.

In operation 904, the processor(s) is/are used to determine whether an object depicted in the digital image belongs to a particular object class among a plurality of object classes. Determining whether the depicted object belongs to a particular object class may be performed using any method as described herein, with particular reference to the object classification methods discussed above with reference to FIGS. 5 and 6.

In operation 906, the processor is/are used to determine one or more object features of the object based at least in part on the particular object class. In one embodiment, object features may be determined using a feature vector, feature vector list, feature matrix, and/or extraction model. This determination is made in response to determining the object belongs to the particular object class. As discussed herein, object features include any unique characteristic or unique combination of characteristics sufficient to identify an object among a plurality of possible objects or any unique characteristic or unique combination of characteristics sufficient to identify an object as belonging to a particular object class among a plurality of object classes. For example, in various approaches object features may include object color, size, dimensions, shape, texture, brightness, intensity, presence or absence of one or more representative mark(s) or other features, location of one or more representative mark(s) or other features, positional relationship between a plurality of representative mark(s) or other features, etc. as would be understood by one having ordinary skill in the art upon reading the present descriptions. Object features may also include internal identifying features as described hereinabove with respect to content-based detection and method 700, in various embodiments.

In a preferred embodiment, one or more object features comprise one or more regions of interest of the object. As understood herein, a region of interest may include any portion of the object that depicts, represents, contains, etc. information the user desires to extract. Thus, in some approaches one or more of the regions of interest comprise one or more text characters, symbols, photographs, images, etc. Preferably, regions of interest comprise identifying features and any associated content, e.g. boilerplate and/or variable content as defined hereinabove. Moreover, regions of interest from which data should be extracted may be selected based at least in part on a downstream application to which the object and/or extracted data are relevant.

For example, in one instance a user may wish to perform a credit check, apply for a loan or lease, etc. In order to perform the desired action, the user needs to gather data, such as an applicant's name, address, social security number, date of birth, etc. The mobile device may receive a digital image of one or more identifying documents such as a utility bill, driver license, social security card, passport, pay stub, etc. which contains/depicts information relevant to performing the credit check, loan or lease application, etc. In this case, regions of interest may include any portion of the identifying document that depicts relevant data, such as the applicant's name, address, social security number, date of birth, etc.

In another example, a user wishes to make an electronic funds transfer, set up a recurring bill payment, engage in a financial transaction, etc. In this case the user may need to gather data such as an account number, routing number, payee name, address, biller name and/or address, signature, payment amount, payment date and/or schedule, etc. as would be understood by one having ordinary skill in the art upon reading the present descriptions. The mobile device may receive a digital image of one or more financial documents such as a bill, remittance coupon, check, credit card, driver license, social security card, passport, pay stub, etc. which contains/depicts information relevant to performing the credit check, loan or lease application, etc. In this case, regions of interest may include any portion of the identifying document that depicts relevant data, such as the account number, routing number, payee name, address, biller name and/or address, signature, payment amount, payment date and/or schedule, etc.

In still another example, a user wishes to authenticate the identity of an individual applying for motor vehicle registration or a new bank account, etc. The applicant provides a driver license as proof of identification. The user may capture an image of the driver license, and extract data from the image including text information such as a name, address, driver license number, etc. The user may also extract a photograph of the licensee from the image, and compare the extracted photograph to a reference photograph of the licensee. The reference photograph may be retrieved from a local database maintained by the motor vehicle administration office, bank, a database maintained by a government agency, etc. in various approaches. Alternatively, the reference photograph may be a previously obtained photograph of the licensee, for example a photograph obtained during a prior transaction requiring identity authentication. Based on the comparison, the user may be presented an indication of whether the extracted photograph matches the reference photograph, along with an optional confidence score, in one embodiment.

Operation 908 includes using the processor(s) to build or select an extraction model based at least in part on the one or more object features. In one embodiment, the object class determines the extraction model. As understood herein, an extraction model encompasses any model that may be applied to a digital image in order to extract data therefrom. In a preferred approach, the extraction model comprises a set of instructions and/or parameters for gathering data from a digital image. In a particularly preferred embodiment, the extraction model utilizes a feature vector and/or list of feature vectors and/or feature matrix to generate and/or modify instructions for extracting data from digital images.

For example, in one approach an exemplary data extraction process as described herein is configured to extract data from various forms of identification based on objects and/or object features (as may be embodied in one or more feature vector(s)) thereof. Illustrative forms of identification may include, for example, a plurality of driver's license formats. Moreover, the illustrative IDs may be classified according to one or more distinguishing criteria, such as an issuing entity (state, administrative agency, etc.) to which the ID corresponds. The extraction model may be selected based on determining an ID in question belongs to one of the predetermined categories of ID (e.g. the ID in question is a Maryland driver's license). Preferably, the selected extraction model is built using a plurality of exemplars from the corresponding category/class.

In one exemplary approach, based on the user input identifying the region(s) of interest, operation 908 may include reviewing one or more existing object class definitions to determine whether the determined object features define a pattern that matches, corresponds, or is similar to a pattern defining features of objects belonging to the existing object class, e.g. based on reference images of the objects belonging to the existing object class. Upon determining the patterns match, correspond or are similar, operation 908 may include selecting an existing extraction model defined for the matching object class, and utilize that extraction model to extract data from the digital image. The existing object class definition and/or extraction model may be retrieved from a memory of the mobile device, a memory in communication with the mobile device, a server, a local or online database, etc. as would be understood by one having ordinary skill in the art upon reading the present descriptions.

Alternatively, operation 908 may include analyzing the image and characteristics thereof to define a feature vector descriptive of the image characteristics. This new feature vector may be used to modify a feature vector, list of feature vectors and/or feature matrix descriptive of the existing object class having the matching, corresponding, or similar pattern of regions of interest. For example, building the extraction model may include mapping the object features to the feature vector, list of feature vectors and/or feature matrix, which may have been modified via the new feature vector as described above. The resulting extraction model is configured to extract data from images depicting objects belonging to the existing object class.

Additionally and/or alternatively, operation 908 may include building a new extraction model based on the object features, in some approaches. More specifically, using one or more processor(s), the image is analyzed and characteristics thereof used to define a feature vector and/or list of feature vectors descriptive of the image characteristics. For example, the feature vector(s) may correspond to image characteristics such as pixel brightness and/or intensity in one or more color channels, brightness and/or intensity of one or more neighboring pixels in one or more color channels, positional relationship of pixels in the image or in a subregion of the image, etc. Image analysis and feature vector definition may be performed in any suitable manner, and preferably may be performed substantially as described above regarding "Document Classification" and "Additional Processing." Using the feature vector(s), operation 908 may include building an extraction model configured to extract data corresponding to image characteristics depicted in the region(s) of interest.

In still further embodiments, building an extraction model may include mapping the feature vector, list of feature vectors, and/or feature matrix, and associating metadata label(s) with each mapped object feature. In one approach mapping the feature vector, list of feature vectors, and/or feature matrix to object features involves processing the feature vector to determine therefrom pertinent location information, color profile information, etc. for the image.

Metadata labels may include any type of information and be associated with any type of object feature. For example, in some embodiments metadata labels may identify object features according to type of data depicted, such as text, alphanumeric characters, symbols, numeric characters, picture, background, foreground, field, shadow, texture, shape, dimension, color profile or scheme, etc. as would be understood by one having ordinary skill in the art upon reading the present descriptions.

In case of invoices for instance, metadata labels may include text and/or relative or absolute location information. For example, a metadata label may identify text as an invoice number with an absolute location at a bottom right corner of the invoice. Moreover, another metadata label may identify text as an invoice date with a relative location directly below the invoice number address on the invoice, etc.

Additionally and/or alternatively, metadata labels may identify object features according to relevance in subsequent processing operations, such as identifying particular data format or informational content. For example, metadata labels may include personal information labels such as "name," "address," "social security number," "driver license number," "date of birth," "credit score," "account number," "routing number," "photograph" etc. as would be understood by one having ordinary skill in the art upon reading the present descriptions.

In operation 910, the processor(s) is/are used to extract data from the digital image based at least in part on the extraction model. Notably, extracting the data does not utilize optical character recognition (OCR) techniques. Rather, the extraction model is preferably defined based on a feature vector, list of feature vectors, and/or feature matrix descriptive of an object or object class, respectively. For instance, in one embodiment data extraction comprises identifying connected components within the digital image (preferably a region of interest of the digital image) and extracting a sub image comprising some or all of the identified connected components. However, as described in further detail below, optical character recognition techniques may be utilized outside the context of data extraction per se as performed in operation 910, such as to establish a location of a bounding box surrounding textual elements represented in the digital image data.

Figure 10:
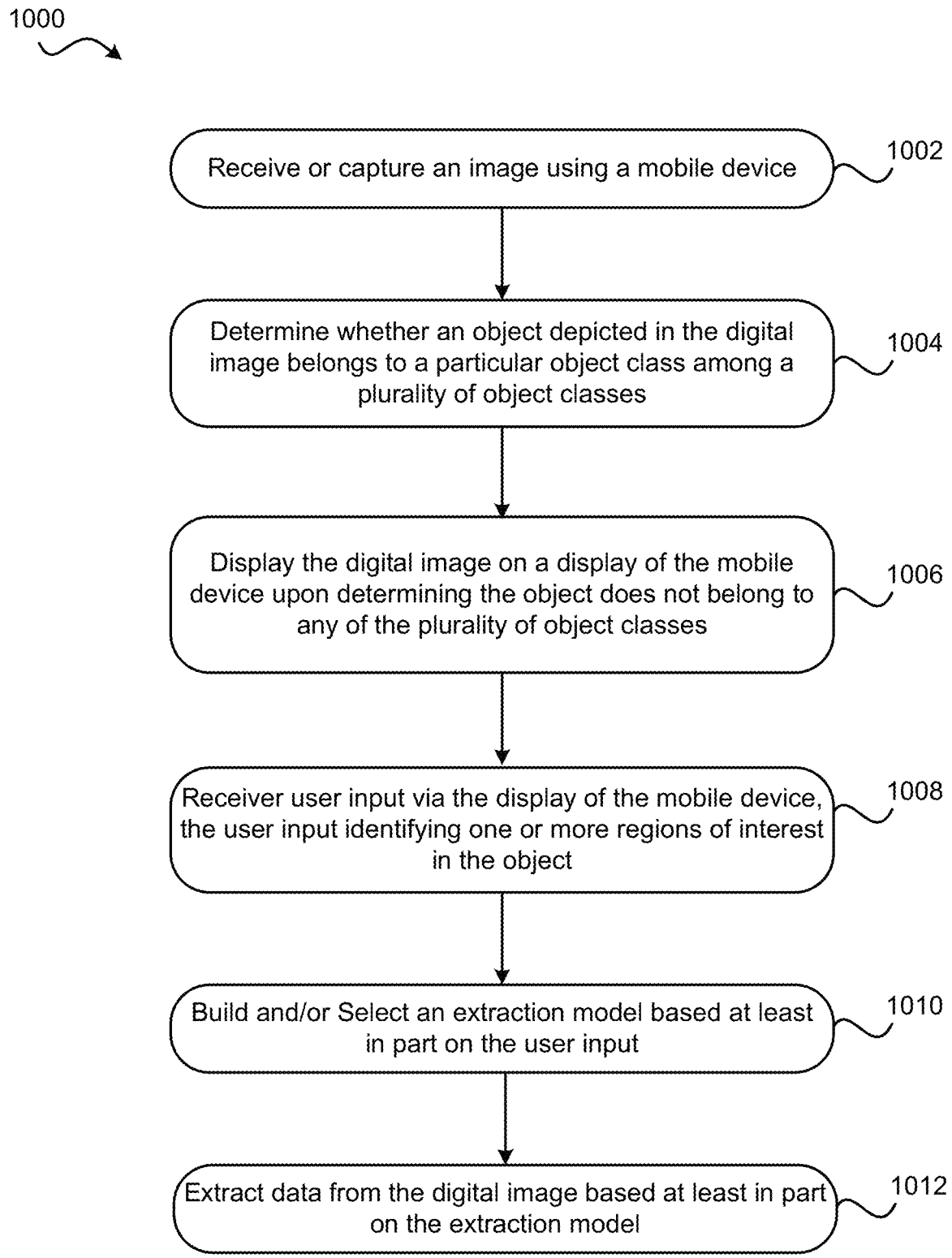
FIG. 10 is a flowchart of a user-mediated method for extracting data from objects depicted in digital images, according to one embodiment.

Referring now to FIG. 10, a method 1000 is shown, according to one embodiment. The method may be performed in any suitable environment and/or utilizing any suitable mechanism(s), including those depicted in FIGS. 1-4C, in various approaches. In one view, the method 1000 may be considered an implementation of a data extraction process as described herein; the implementation is in the format of a mobile application being engaged by a user.

In one approach, method 1000 includes operation 1002, where a digital image captured by a mobile device is received. The digital image may be received and/or stored in a memory of the mobile device used to capture the image, another mobile device, and/or a remote computer such as a server and/or cloud storage environment, in various embodiments. Moreover, the digital image may be received from a variety of sources, such as a component of the mobile device including a camera, a memory, wireless receiver, antenna, etc. as would be understood by one having ordinary skill in the art upon reading the present descriptions. In other approaches, the digital image may be received from a remote device, such as a remote server, another mobile device, a camera with integrated data transmission capability, a facsimile machine or other multifunction printer, etc. The digital image may optionally be received via an online service, a database, etc. as would be understood by the skilled artisan reading this disclosure.

Method 1000 includes performing operations 1002-1012 using a single processor or combination processors, such as a processor of the mobile device used to capture the image and/or a processor of another mobile device, one or more processors of a server or multiple servers, one or more processing resources of a remote cloud computing environment, etc., in various embodiments.

In operation 1004, the processor(s), preferably including at least a mobile device processor, is/are used to determine whether an object depicted in the digital image belongs to a particular object class among a plurality of object classes. Determining whether an object belongs to a particular object class may be performed according to any suitable method, and is preferably performed in a manner commensurate with the descriptions in related U.S. patent application Ser. No. 14/209,825 regarding Document Classification, e.g. as set forth with respect to FIGS. 5 & 6 of U.S. patent application Ser. No. 14/209,825, in various embodiments.

In operation 1006, once again preferably using the processor of the mobile device, the digital image is displayed on a mobile device display. The digital image is displayed in response to determining the object does not belong to any particular object class among the plurality of object classes. Additionally and/or alternatively, the digital image may be displayed in response to determining the object does belong to a particular object class among the plurality of object classes.

Displaying the digital image on the mobile device display enables further action conducive to efficient and robust extraction of data from digital images using a processor. For example, in various approaches the digital image may be displayed on the mobile device display (or another device's display, such as a desktop computer, server, etc.) to provide feedback regarding the digital image, such as image quality, object classification (or lack thereof), extracted data, etc. Similarly, the digital image may be displayed to facilitate receiving additional input from a user, such as: user feedback regarding a classification and/or extraction result; metadata associated with or to be associated with the digital image, object depicted therein, and/or a particular object class to which the depicted object is determined to belong, etc.; instructions to perform additional processing, extraction, or other manipulation of the digital image, etc. as would be understood by one having ordinary skill in the art upon reading the present descriptions.

Operation 1008 includes using the processor(s) to receive user input via the display of the mobile device. More particularly, the user input identifies one or more regions of interest in the object. In one embodiment of a method 1000 including operation 1008, the image of the identifying document may be presented to the user via the mobile device display. The user may be prompted to confirm, negate, and/or modify identifying features of the object, regions of interest identified based on an object classification, etc. The user may additionally and/or alternatively be prompted to define, confirm, negate, and/or modify identifying features of the object, regions of interest not identified based on the classification, etc., in various embodiments.

In operation 1010, an extraction model is built and/or selected based at least in part on the user input received in operation 1008. In one exemplary approach, based on the user input identifying the region(s) of interest, operation 1010 may include, using the processor(s), reviewing one or more existing object class definitions to determine whether the identified regions of interest define a pattern that matches, corresponds, or is similar to a pattern defining regions of interest of objects belonging to the existing object class. Upon determining the patterns match, correspond or are similar, operation 1010 may include selecting an existing extraction model defined for the matching object class, and utilize that extraction model to extract data from the digital image.

Alternatively, operation 1010 may include analyzing the image and characteristics thereof to define a feature vector descriptive of the image characteristics, where the feature vector preferably includes at least internal identifying features of the object. This new feature vector may be used to modify a list of feature vectors and/or feature matrix descriptive of the existing object class having the matching, corresponding, or similar pattern of regions of interest. The resulting extraction model is configured to extract data from images depicting objects belonging to the existing object class, including raw image data, data corresponding to text, images, photographs, symbols, etc. as would be understood by one having ordinary skill in the art upon reading the present descriptions.

Additionally and/or alternatively, operation 1010 may include building, using the processor(s), a new extraction model based on the user input defining the regions of interest, identifying features, etc., in some approaches. More specifically, using the processor of the mobile device, the image is analyzed and characteristics thereof used to define a feature vector descriptive of the regions of interest, identifying features, and/or other image characteristics. For example, the feature vector may correspond to image characteristics such as pixel brightness and/or intensity in one or more color channels, brightness and/or intensity of one or more neighboring pixels in one or more color channels, positional relationship of pixels in the image or in a subregion of the image, regions of a document likely to depict text, regions of a document likely to depict a photograph, etc. Image analysis and feature vector definition may be performed in any suitable manner, and preferably may be performed substantially as described above regarding "Document Classification" and "Additional Processing." Using the feature vector, operation 1010 may include building an extraction model configured to extract data corresponding to image characteristics depicted in the region(s) of interest.

In operation 1012, data is extracted, using the processor(s), from the image based at least in part on the extraction model. Notably, extracting the data does not utilize optical character recognition (OCR) techniques. Rather, the extraction model is preferably defined based on a feature vector, list of feature vectors, and/or feature matrix descriptive of an object or object class, respectively. For instance, in one embodiment data extraction comprises identifying connected components within the digital image (preferably a region of interest of the digital image) and extracting a sub image comprising some or all of the identified connected components. However, optical character recognition techniques may be utilized outside the context of data extraction per se as performed in operation 1012, such as to establish a location of a bounding box surrounding textual elements represented in the digital image data.

In one illustrative embodiment, a user, via a mobile application adapted to facilitate performing data classification and/or extraction as described herein, may perform a classification operation to attempt classifying an object depicted in a digital image. Depending on whether the classification algorithm has been trained to recognize an object as belonging to a particular object class, the algorithm may or may not successfully classify the particular object depicted in the digital image. After completing one or more classification attempts, the image of the identifying document may be presented to the user via the mobile device display. The user may be prompted to confirm, negate, and/or modify regions of interest identified based on the object classification. The user may additionally and/or alternatively be prompted to define one or more regions of interest not identified based on the classification.

Similarly, if the classification attempt fails to identify the object class, the user may be prompted to define a new object class and further define one or more regions of interest in object belonging to the new object class by interacting with the display of the mobile device. For example, a user may draw one or more bounding boxes around regions of interest by providing tactile feedback via the mobile device display. The user may then direct the mobile application to extract data from the digital image, and the application optionally employs the processor of the mobile device, a server, etc. to build and/or select an extraction model based at least in part on the user-defined regions of interest and extract data from the digital image based in whole or in part on the extraction model.

Classification may include any functionality as described in related U.S. Patent Application Nos. 13/802,226 and/or 14/209,825, in various approaches and without departing from the scope of the inventive concepts presented herein. As noted above, U.S. Patent Application Nos. 13/802,226 and/or 14/209,825 are incorporated herein by reference and respectively teach various inventive embodiments of classification and extraction techniques.

In various approaches, methods 900 and/or 1000 may optionally include one or more additional functionalities, features and/or operations as described below.

In one approach, method 900 and/or method 1000 may further include training the extraction model. Training an extraction model may be accomplished using any known method, model, mechanism, etc. as would be understood by one having ordinary skill in the art upon reading the present descriptions. In a preferred embodiment, training comprises a learn-by-example (LBE) process. Specifically, for a particular object class, a plurality of representative objects may be provided with or without associated metadata labels. Based at least in part on the object features of the provided representative objects, the extraction model may be trained to modify and thus improve the robustness of extracting data from objects belonging to the object class.

Those having ordinary skill in the art will appreciate that in some approaches extraction model training may be specifically designed to improve the ability of the extraction model to precisely and accurately extract data from objects corresponding to a particular object class for which the extraction model was built. Such training may improve extraction precision and/or accuracy by training the model by providing a set of objects characterized by substantially identical object features, e.g. a plurality of copies of the same object type such as a standardized form, document type, multiple images of the same object, etc. Using this training set, the extraction model may reinforce the list of feature vectors and/or feature matrix representing objects in the class, and improve the robustness of extracting data from objects belonging to the class.

Alternatively, training may be specifically designed to improve the ability of the extraction model to extract data from a set of objects within an object class characterized by variable object features, or across several object classes. Such training may involve providing a set of objects with diverse characteristics to improve the extraction model's ability to extract data generally from a diverse object class or several object classes.

In more approaches, the extraction model may be trained using the processor of the mobile device. Moreover, the trained extraction model may be stored and/or exported, e.g. to a memory, a buffer, another process or processor, etc. The trained extraction model may be preferably stored and/or exported to a memory of the mobile device, a processor of the mobile device, or another process being executed using the processor of the mobile device. In various embodiments, the trained extraction model may be flagged and/or retrieved for subsequent use by the mobile device or another mobile device. Similarly, the extraction model may be stored and/or passed to a memory and/or processor of another device, such as another mobile device, a server, a cloud computing environment, etc.

Preferably, training as described herein utilizes a training set comprising a plurality of objects, and more preferably the training set comprises no less than five objects.

In addition to training the extraction model, some embodiments of method 900 may additionally and/or alternatively encompass performing at least one OCR technique on one or more regions of the digital image. The OCR'ed region(s) may correspond to one or more of the object features (e.g. object features identified using the object class definition and/or extraction model) and/or other object features (e.g., features were not previously identified using the object class definition and/or extraction model).

Still more embodiments of method 900 and/or method 1000 may further include detecting one or more lines of text in objects such as documents. In some approaches, detecting text lines involves projecting the digital image onto a single dimension. In an exemplary approach, a projection may be made along a dimension perpendicular to the predominant axis of text line orientation, so that text lines and areas between lines of text can be easily distinguished according to dark area density (e.g. black pixel density, count, etc.). Thus, if the document is oriented in portrait, detecting text includes projecting along the vertical dimension (y-axis) and if the document is in landscape orientation, detecting text includes projecting along the horizontal dimension (x-axis). The projection can also be used to determine and/or manipulate orientation (portrait, landscape, or any other angle of skew) of a document, in other approaches. For example, in an exemplary embodiment configured to classify and extract data from images of documents corresponding to a standard ID such as a driver's license, detecting lines of text, etc. may be utilized to determine a most likely document orientation from among a plurality of possible orientations (e.g. 0°, 90°, 180°, or 270° rotation angle, in one approach).

Detecting text lines may additionally include determining a distribution of light and dark areas along the projection; determining a plurality of dark pixel densities. Moreover, each dark pixel density may correspond to a position along the projection. Upon determining the plurality of dark pixel densities, probable text lines may be determined according to whether the corresponding dark pixel density is greater than a probable text line threshold, which may be predefined by a user, determined experimentally, automatically determined, etc. In embodiments where a probable text line threshold is employed, detecting text lines further includes designating each position as a text line upon determining the corresponding dark pixel density is greater than the probable text line threshold.

In another embodiment detecting text lines may include detecting a plurality of connected components non-background elements in the digital image, and determining a plurality of likely characters based on the plurality of connected components.

In one embodiment, likely characters may be found within or characterized by regions of a digital image characterized by a predetermined number of light-to-dark transitions in a given direction, such as three light-to-dark transitions in a vertical direction as would be encountered for a small region of the digital image depicting a capital letter "E." Each light-to-dark transition may correspond to a transition from a background of a document (light) to one of the horizontal strokes of the letter "E." Of course, other numbers of light-to-dark transitions may be employed, such as two vertical and/or horizontal light-to-dark transitions for a letter "o," one vertical light to dark transition for a letter "l," etc. as would be understood by one having ordinary skill in the art upon reading the present descriptions.

In another embodiment, likely characters and/or text blobs may be detected using or within maximally stable extremal regions of the image. A maximally stable extremal region is a connected area characterized by almost uniform intensity or color, surrounded by contrasting background. The regions are determined as those that maintain unchanged shapes over multiple thresholds.

For instance, in one exemplary MSER approach, for each threshold, the connected components are computed, and for each component, the corresponding area thereof is determined. Stable regions are those with persistent areas over multiple thresholds. Preferably, dA/dt is near zero, where A is the area, t is threshold, dA is the differential of A, and dt is the differential of the threshold t).

Those having ordinary skill in the art will appreciate that likely characters may be determined using either or both of the foregoing exemplary approaches, as well as other techniques known in the art, in any combination without departing from the scope of the presently described inventive embodiments.

Upon determining likely characters, lines of text may be determined by identifying regions of the image having a plurality of adjacent characters, and may define the text lines according to a text baseline of the plurality of adjacent characters, in one embodiment.

In some approaches, it is possible to determine and/or manipulate image orientation based on the result of projecting the image along one dimension. For example, if a projection produces a one-dimensional pattern of high dark pixel density regions interspersed with low dark pixel density regions, then it is probable that the projection was made along the axis perpendicular to the longitudinal axis of text line orientation (i.e. a projection along the y-axis for a document in "portrait" orientation having text oriented from left-to-right along the x-axis of the image; or a projection along the x-axis for a document in "landscape" orientation having text oriented bottom-to-top along the y-axis of the image). Based on this probabilistic determination, one may optionally rotate and/or reorient the image based on projection results.

Those having ordinary skill in the art will appreciate that detecting text lines based on dark pixel density along a one-dimensional projection may be particularly challenging for color images. For example, some documents may depict text in a color relatively lighter than the background, in which case dark pixel density would indicate absence of a probable text line rather than presence thereof. In that case, detecting text lines may involve designating probable text lines near any position along the projection upon determining the position is characterized by a dark pixel density less than a dark pixel density threshold.

Moreover, text may be presented in a variety of colors, and mere dark pixel density may be an insufficient characteristic from which to identify probable text lines. In order to address these challenges, detecting text lines in color images preferably includes projecting each color channel of the digital image onto a single channel along the single dimension. In other words, color channel intensity values (e.g. integer values between 0-255) are transformed into a single intensity value. The transformation may be accomplished according to any suitable function, and in a preferred embodiment the intensity of each color channel for a given pixel or set of pixels is averaged and the pixel or set of pixels is assigned a representative intensity value according to the average of the color channel intensity values.

In another embodiment, data extraction may include associating object classes with one or more lists of object regions containing information of interest, for example a list of rectangular regions of a document that contain text, or that may contain text and the color of expected text.

In one illustrative example, a user is presented an image of an object via a display of a mobile device. The user interacts with the image via the mobile device display, and defines one or more regions of interest, for example indicating a region displaying the user's name, address, license number, etc. The user can repeat the process for a multitude of images, and thus provide training images either intentionally or as part of a transparent process. Once a sufficient number of training examples have been defined (e.g. about 5 in the case of a small document such as a driver license), the training algorithm may be executed automatically or at the user's discretion. The result of training is an extraction model can be used to automatically extract the relevant locations and rectangles of subsequently presented unknown documents, all without utilizing OCR techniques.

In other approaches, after data is extracted according to the above-described methods, OCR techniques may be utilized for purposes other than mere data extraction. For example, OCR may be performed using a processor of the mobile device, and may only OCR a small subset of the total image. Alternatively, OCR may be performed using a processor of a server. In order to reduce communication time between the mobile device and the server, only portion(s) of the image to be processed using OCR may be transmitted to the server.

In additional embodiments, classification and/or extraction results may be presented to a user for validation, e.g. for confirmation, negation, modification of the assigned class, etc. For example, upon classifying an object using semi- or fully automated processes in conjunction with distinguishing criteria such as defined herein, the classification and the digital image to which the classification relates may be displayed to a user (e.g. on a mobile device display) so that the user may confirm or negate the classification. Upon negating the classification, a user may manually define the "proper" classification of the object depicted in the digital image. This user input may be utilized to provide ongoing "training" to the classifier(s), in preferred approaches. Of course, user input may be provided in relation to any number of operations described herein without departing from the scope of the instant disclosures.

In even more preferred embodiments, the aforementioned validation may be performed without requiring user input. For instance, it is possible to mitigate the need for a user to review and/or to correct extraction results by performing automatic validation of extraction results. In general, this technique involves referencing an external system or database in order to confirm whether the extracted values are known to be correct. For example, if name and address are extracted, in some instances it is possible to validate that the individual in question in fact resides at the given address.

This validation principle extends to classification, in even more embodiments. For example, if the extraction is correct, in some approaches it is appropriate to infer that the classification is also correct. This inference relies on the assumption that the only manner in which to achieve the "correct" extraction result (e.g. a value matches an expected value in a reference data source, matches an expected format for the value in question, is associated with an expected symbol or other value, etc. as would be understood by one having ordinary skill in the art upon reading the present descriptions).

Content-Based Detection and Data Extraction

As noted above, the presently described inventive concepts include the notion of content-based detection of objects and extraction of data therefrom. Individual details of content-based detection and data extraction, respectively, are described hereinabove, according to various embodiments which may be combined in any suitable manner that would be appreciated by a skilled artisan reading the present disclosure.

Figure 11:
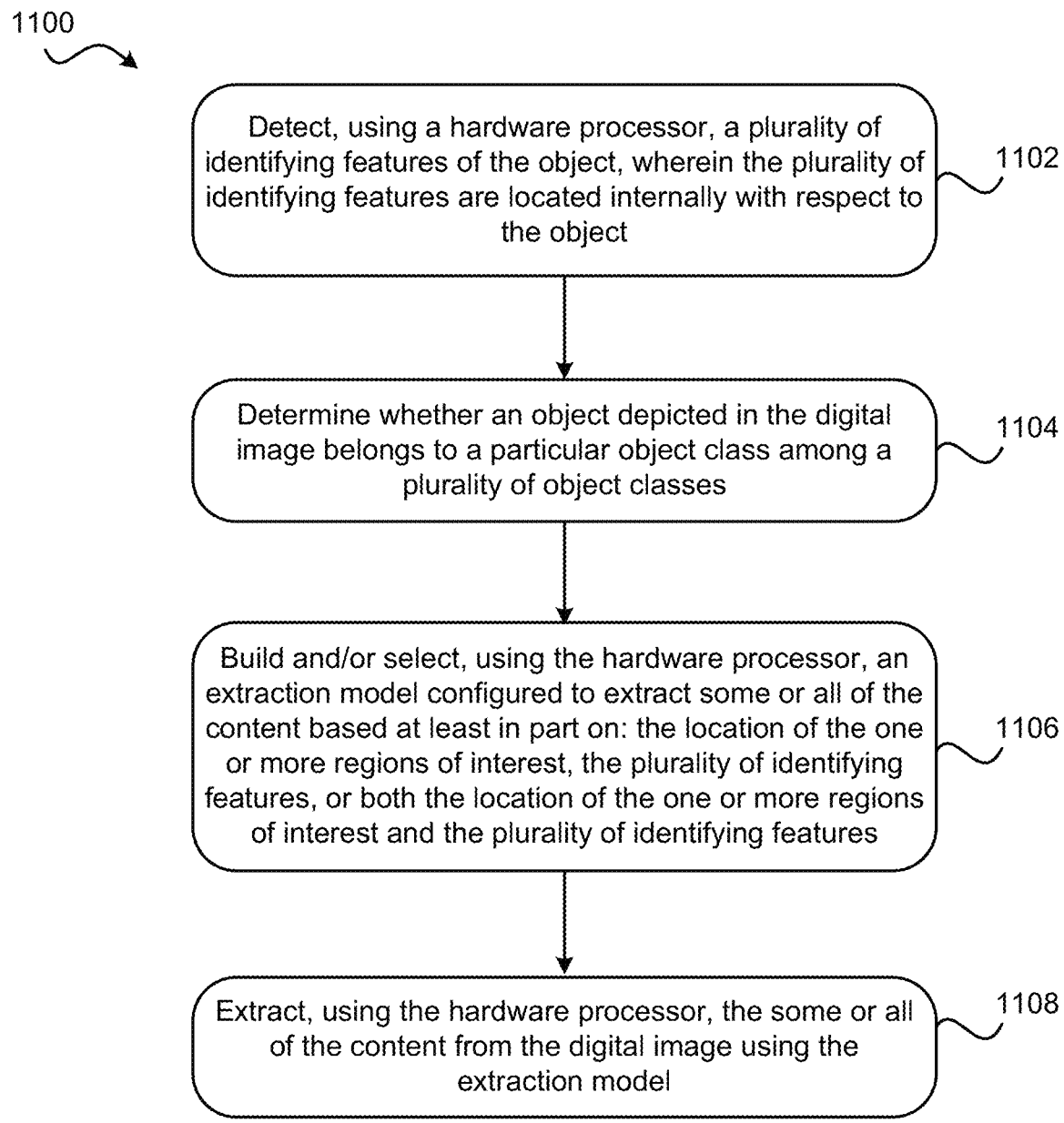
FIG. 11 is a flowchart of a method for extracting data from objects depicted in digital images based on internal features of the object, according to one embodiment.

In a particularly preferred embodiment, a combined approach to content-based detection and data extraction is shown in FIG. 11, with reference to method 1100. As will be understood by a person having ordinary skill in the art upon reading the present descriptions, the method 1100 may be performed in any suitable environment, including those depicted in FIGS. 1-2 and may operate on inputs and/or produce outputs as depicted in FIGS. 3A-5, in various approaches.

As shown in FIG. 11, method 1100 includes operation 1102, where a plurality of identifying features of an object depicted in a digital image are detected, preferably using a hardware processor. Importantly, the identifying features are located internally with respect to the object rather than being located on or part of edges of the object.

In operation 1104, method 1100 includes projecting a location of one or more regions of interest of the object based at least in part on the plurality of identifying features. Each region of interest preferably depicts content, optionally including boilerplate content, variable content, or combinations thereof, in various embodiments. For instance, in one approach based on the set of identifying features detected within the object, the type of object and/or layout of content within the object may be inferred, e.g. based on comparing the set of identifying features, a feature vector representing the identifying features and/or other image characteristics, or some other suitable representation of the object to a plurality of reference images, reference feature vectors, reference feature vector matrices, etc. as would be appreciated by a person having ordinary skill in the art upon reading the present disclosure and materials incorporated herein by reference.

In operation 1106 of method 1100 an extraction model is built, selected, or both (e.g. by building upon an existing extraction model to accommodate new/different characteristics of a particular object type). The extraction model is configured to extract some or all content of the object as depicted in the image, e.g. using techniques as described herein above with respect to FIGS. 9-10, and based at least in part on the location of the one or more regions of interest, the plurality of identifying features, or both, in alternative approaches. Of course, iterative content extraction may be configured to extract content in a multi-pass procedure where each pass involves extracting a different type of content or extracting content on a different basis.

The extraction model built/selected in operation 1106 is then utilized to extract some or all content from the digital image in operation 1108.

Of course, method 1100 may include any combination of additional features, operations, functions, and/or details described herein and in the related applications incorporated by reference hereinabove.

For instance, and according to particularly preferred embodiments, at least some of the content extracted from the digital image comprises variable content positioned adjacent to boilerplate content representing some of the plurality of identifying features.

Moreover, the content extracted from the digital image may be selected based on a downstream application in which the extracted content will be utilized. For instance, different information may be relevant to a loan application as opposed to an identity validation workflow or mobile bill payment. Accordingly, the pertinent information in the context of the downstream application may dictate the particular content extracted from the image, as described hereinabove and as would be appreciated by persons having ordinary skill in the art upon reading the present disclosure.

In more embodiments, method 1100 may preferably include an automated feature discovery (or feature zone discovery) process that is transparent to the user. Automated feature zone discovery preferably includes matching a plurality of pixels in the digital image to a plurality of corresponding pixels in a plurality of reference images to form a set of matching pairs, each matching pair including one pixel from the digital image and one pixel from one of the plurality of reference images; and determining a subset of the matching pairs exhibiting a frequency within the set of matching pairs that is greater than a predetermined frequency threshold.

The foregoing descriptions of methods 700-1100 should be understood as provided by way of example to illustrate the inventive concepts disclosed herein, without limitation. In other approaches, the techniques disclosed herein may be implemented as a system, e.g. a processor and logic configured to cause the processor to perform operations as set forth with respect to methods 700-1100, as well as a computer program product, e.g. a computer readable medium having stored thereon computer readable program instructions configured to cause a processor, upon execution thereof, to perform operations as set forth with respect to methods 700-1100. Any of the foregoing embodiments may be employed without departing from the scope of the instant descriptions.

In addition, it should be understood that in various approaches it is advantageous to combine features, operations, techniques, etc. disclosed individually with respect to content based detection and content based recognition as described herein. Accordingly, the foregoing exemplary embodiments and descriptions should be understood as modular, and may be combined in any suitable permutation, combination, selection, etc. as would be understood by a person having ordinary skill in the art reading the present disclosure. In particular, leveraging a four-point algorithm and estimating homography transforms to facilitate content-based recognition and content-based reconstruction of image data are especially advantageous in preferred embodiments.

While various embodiments have been described above, it should be understood that they have been presented by way of example only, and not limitation. Thus, the breadth and scope of an embodiment of the present invention should not be limited by any of the above-described exemplary embodiments.

What is claimed is:

1. A computer-implemented method of detecting an object depicted in a digital image, the method comprising:
    detecting, using a hardware processor, a plurality of identifying features of the object, wherein the plurality of identifying features are located internally with respect to the object;
    projecting, using the hardware processor, a location of one or more regions of interest of the object based at least in part on the plurality of identifying features, wherein each region of interest depicts content, and wherein the projecting comprises comparing one or more feature vectors representing the object to one or more reference feature vectors and/or one or more reference feature matrices;

building and/or selecting, using the hardware processor, an extraction model configured to extract some or all of the content based at least in part on: the location of the one or more regions of interest, the plurality of identifying features, or both the location of the one or more regions of interest and the plurality of identifying features; and extracting, using the hardware processor, the some or all of the content from the digital image using the extraction model; and wherein at least a portion of one or more edges of the object is missing from the digital image.

2. The computer-implemented method as recited in claim 1, wherein extracting the some or all of the content from the digital image does not utilize OCR.

3. The computer-implemented method as recited in claim 1, wherein the plurality of identifying features comprise boilerplate content, and wherein the boilerplate content is selected from the group consisting of: one or more internal lines of the object, one or more symbols appearing on the object, one or more text characters, and combinations thereof.

4. The computer-implemented method as recited in claim 3, wherein the one or more symbols are selected from the group consisting of: one or more icons, a fingerprint, a pattern of lines appearing on the object, one or more intersections between lines appearing on the object, and combinations thereof.

5. The computer-implemented method as recited in claim 1, comprising:
cropping the digital image based at least in part on a projected location of one or more edges of the object; and
classifying the object depicted within the cropped digital image.

6. The computer-implemented method as recited in claim 1, comprising:
attempting to detect the object within the digital image using a plurality of predetermined object detection models each corresponding to a known object type; and
determining a classification of the object based on a result of attempting to detect the object within the digital image using the plurality of predetermined object detection models; and
wherein the classification of the object is determined to be the known object type corresponding to one of the object detection models for which the attempt to detect the object within the digital image was successful.

7. A computer-implemented method of detecting an object depicted in a digital image, the method comprising:
detecting, using a hardware processor, a plurality of identifying features of the object, wherein the plurality of identifying features are located internally with respect to the object;
projecting, using the hardware processor, a location of one or more regions of interest of the object based at least in part on the plurality of identifying features, wherein projecting the location of the one or more regions of interest of the object is based on a mapping of key points within some or all of the plurality of identifying features to key points of a reference image depicting an object belonging to a same class as the object depicted in the digital image, and wherein each region of interest depicts content;

building and/or selecting, using the hardware processor, an extraction model configured to extract some or all of the content based at least in part on: the location of the one or more regions of interest, the plurality of identifying features, or both the location of the one or more regions of interest and the plurality of identifying features; and extracting, using the hardware processor, the some or all of the content from the digital image using the extraction model.

8. The computer-implemented method as recited in claim 7, wherein the plurality of identifying features comprise boilerplate content.

9. The computer-implemented method as recited in claim 8, wherein the boilerplate content is selected from the group consisting of: one or more internal lines of the object, one or more symbols appearing on the object, one or more text characters, and combinations thereof.

10. The computer-implemented method as recited in claim 9, wherein the one or more symbols are selected from the group consisting of: one or more icons, a fingerprint, a pattern of lines appearing on the object, one or more intersections between lines appearing on the object, and combinations thereof.

11. The computer-implemented method as recited in claim 7, comprising:
cropping the digital image based at least in part on a projected location of one or more edges of the object; and
classifying the object depicted within the cropped digital image.

12. The computer-implemented method as recited in claim 7, comprising:
attempting to detect the object within the digital image using a plurality of predetermined object detection models each corresponding to a known object type; and
determining a classification of the object based on a result of attempting to detect the object within the digital image using the plurality of predetermined object detection models; and
wherein the classification of the object is determined to be the known object type corresponding to one of the object detection models for which the attempt to detect the object within the digital image was successful.

13. The computer-implemented method as recited in claim 7, wherein at least a portion of one or more edges of the object is at least partially obscured and/or missing in the digital image.

14. A computer-implemented method of detecting an object depicted in a digital image, the method comprising:
detecting, using a hardware processor, a plurality of identifying features of the object, wherein the plurality of identifying features are located internally with respect to the object;
cropping the digital image based at least in part on a projected location of one or more edges of the object, wherein the projected location of the one or more edges of the object is based at least in part on the plurality of identifying features;
detecting one or more transitions between the background and the object within the cropped digital image;
projecting, using the hardware processor, a location of one or more regions of interest of the object based at least in part on the plurality of identifying features, wherein each region of interest depicts content;

building and/or selecting, using the hardware processor, an extraction model configured to extract some or all of the content based at least in part on: the location of the one or more regions of interest, the plurality of identifying features, or both the location of the one or more regions of interest and the plurality of identifying features; and extracting, using the hardware processor, the some or all of the content from the digital image using the extraction model.

15. The computer-implemented method as recited in claim 14, wherein the plurality of identifying features comprise boilerplate content.

16. The computer-implemented method as recited in claim 15, wherein the boilerplate content is selected from the group consisting of: one or more internal lines of the object, one or more symbols appearing on the object, one or more text characters, and combinations thereof.

17. The computer-implemented method as recited in claim 16, wherein the one or more symbols are selected from the group consisting of: one or more icons, a fingerprint, a pattern of lines appearing on the object, one or more intersections between lines appearing on the object, and combinations thereof.

18. The computer-implemented method as recited in claim 14, comprising:

cropping the digital image based at least in part on a projected location of one or more edges of the object; and classifying the object depicted within the cropped digital image.

19. The computer-implemented method as recited in claim 14, comprising:

attempting to detect the object within the digital image using a plurality of predetermined object detection models each corresponding to a known object type; and determining a classification of the object based on a result of attempting to detect the object within the digital image using the plurality of predetermined object detection models; and wherein the classification of the object is determined to be the known object type corresponding to one of the object detection models for which the attempt to detect the object within the digital image was successful.

20. The computer-implemented method as recited in claim 14, wherein at least a portion of one or more edges of the object is at least partially obscured and/or missing in the digital image.

* * * * *